(12) United States Patent
Kropf

(10) Patent No.: US 8,177,389 B1
(45) Date of Patent: May 15, 2012

(54) DETERMINISTICALLY CALCULATING DIMMING VALUES FOR FOUR OR MORE LIGHT SOURCES

(75) Inventor: Benjamin T. Kropf, Seattle, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 1083 days.

(21) Appl. No.: 12/079,646

(22) Filed: Mar. 28, 2008

Related U.S. Application Data

(60) Provisional application No. 60/972,135, filed on Sep. 13, 2007.

(51) Int. Cl.
*B60Q 1/26* (2006.01)
*H05B 37/00* (2006.01)

(52) U.S. Cl. ........................................ 362/231

(58) Field of Classification Search .......... 362/227, 362/230, 231, 240, 236, 800; 315/307, 308, 315/312, 318, 360, 362, 294, 297, 224, 149, 315/158; 345/44, 46, 82, 83, 690, 691, 589, 345/600, 601
See application file for complete search history.

(56) References Cited

U.S. PATENT DOCUMENTS

| | | | |
|---|---|---|---|
| 5,243,414 A | 9/1993 | Dalrymple et al. | |
| 5,384,901 A | 1/1995 | Glassner et al. | |
| 5,844,699 A | 12/1998 | Usami et al. | |
| 6,016,038 A * | 1/2000 | Mueller et al. | 315/291 |
| 6,150,774 A | 11/2000 | Mueller et al. | |
| 6,348,977 B1 | 2/2002 | Ooki | |
| 6,351,739 B1 | 2/2002 | Egendorf | |
| 6,570,584 B1 | 5/2003 | Cok et al. | |
| 6,727,765 B1 | 4/2004 | Ess | |
| 7,014,336 B1 | 3/2006 | Ducharme et al. | |
| 7,256,557 B2 * | 8/2007 | Lim et al. | 315/312 |
| 7,712,917 B2 * | 5/2010 | Roberts et al. | 362/227 |
| 2004/0218387 A1 * | 11/2004 | Gerlach | 362/231 |
| 2008/0180040 A1 * | 7/2008 | Prendergast et al. | 315/297 |

OTHER PUBLICATIONS

Ben Kropf, Applications Engineer, Cypress Semiconductor Corp., "*Firmware—RGB Color Mixing Firmware for EZ-Color™—AN16035*", Cypress Application Note, Jun. 13, 2007, Document No. 001-16035 Rev.*A, pp. 1-7.

Patrick Prendergast, Applications Engineer, Cypress Semiconductor Corp., "*Thermal Design Considerations for High-Power LED Systems*", http://www.automotivedesignline.com/howto/197700496;jsessionid=PJRTJPQ3NPS4SQS, Automotive Design Line, Feb. 12, 2007, Accessed Mar. 26, 2008, pp. 1-5.

PCT International Search Report and Written Opinion of the International Searching Authority, PCT/US08/008917 filed Jul. 22, 2008, mailed Sep. 29, 2008.

* cited by examiner

*Primary Examiner* — Bao Q Truong

(57) ABSTRACT

An intelligent light source deterministically calculates luminous flux levels of individual color sources of four or more light sources without a look-up table to determine the luminous flux levels.

18 Claims, 16 Drawing Sheets

DETERMINISTICALLY CALCULATING DIMMING VALUES FOR FOUR OR MORE LIGHT SOURCES

RELATED APPLICATION

This application claims the benefit of U.S. Provisional Patent Application No. 60/972,135, filed Sep. 13, 2007, the entire contents of which are hereby incorporated by reference herein.

TECHNICAL FIELD

The present invention relates to the control of one or more intelligent light source devices and, in one embodiment, to a communication protocol that transmits data encoded with color information.

BACKGROUND

Light-emitting diode (LED) technology has advanced to the point where LEDs can be used as energy efficient replacements for conventional incandescent and/or fluorescent light sources. One application where LEDs have been employed is in ambient lighting systems using white and/or colored (e.g., red, green and blue) LEDs. Like incandescent and fluorescent light sources, the average luminous flux of an LED's output is controlled by the average current through the device. Unlike incandescent and fluorescent light sources, however, LEDs can be switched on and off almost instantaneously. As a result, their luminous flux can be controlled by switching circuits that switch the device current between two current states to achieve a desired average current corresponding to a desired luminous flux. This approach can also be used to control the relative intensities of red, green, and blue (RGB) LED sources (or any other set of colored LED sources) in ambient lighting systems that mix colored LEDs in different ratios to achieve a desired color.

One approach to LED switching is described in U.S. Pat. Nos. 6,016,038 and 6,150,774 of Meuller et al. These patents describe the control of different LEDs with square waves of uniform frequency but independent duty cycles, where the square wave frequency is uniform and the different duty cycles represent variations in the width of the square wave pulses. U.S. Pat. Nos. 6,016,038 and 6,150,774 describe this as pulse width modulation (PWM). This type of control signal has high spectral content at the uniform frequency and its odd harmonics, which can cause electromagnetic interference (EMI) to sensitive devices, components, circuits, and systems nearby.

U.S. Pat. Nos. 6,016,038 and 6,150,774 also describe a conventional networked illumination system that utilizes a DMX512 protocol to address network data to multiple individually addressed microcontrollers from a central network controller. Using the DMX512 protocol, the relative luminous flux of each individual color in a light source is transmitted from a lighting controller to a light source, as illustrated in FIG. 1A.

In solid-state (LED) lighting, the luminous flux output of each LED at a given operating current decreases as the junction temperature of the LED increases. LED junction temperature can increase due to power dissipation in the LED and/or increases in ambient temperature. This effect, illustrated in the curves of FIG. 1B, can create both luminous flux errors and errors in color mixing because the magnitude of the effect is different for LEDs of different colors.

Another temperature effect in LEDs is a shift of the dominant wavelength of an LED as the junction temperature of the LED changes. Typically, the dominant wavelength increases as junction temperature increases, causing a red shift. This effect can cause additional color distortion independent of the luminous flux effects.

Another effect in LED lighting networks is LED aging. In general, the luminous flux of an LED decreases with accumulated operating time. The rate of decrease is different for different color LEDs and is affected by the operating current and temperature of the LED. This effect can cause luminous flux errors and color distortion independent of the other effects mentioned above.

In one conventional system, three individual colors are mixed using a three-color mixing equation. The three-color mixing equation is used to solve for the three intensity levels needed from the three light sources to create a mixed color. In another conventional system, four or more colors can be mixed; however, instead of solving for the four intensity levels with an equation, a controller of the conventional system uses a look-up table to determine the intensity levels for the four or more colors, as illustrated in the conventional system of FIG. 1C that mixes four colors. The conventional system of FIG. 1C includes a processor that receives a mixed-color request. Instead of deterministically solving for the dimming values of the four light sources, the processor accesses dimming values in the look-up table stored in memory, and sends the looked up dimming values to the dimming circuitry and light sources. This type of conventional system is limited in the number of allowable color coordinate inputs. The number of allowable color coordinate inputs is limited by the size of available memory (e.g., read-only memory (ROM) or Flash memory) in which the look-up table is stored. By increasing the number of allowable color coordinate inputs in the look-up table, the size of memory also increases. As such, there are fewer unique colors that can be mixed using this conventional system. Also, it makes temperature and optical feedback to account for light source variances unfeasible. This is because for each feedback variable, another dimension of look-up tables must be added in memory. Therefore, the memory use increases exponentially as information feedback is implemented.

When using only three light sources in a conventional color mixing system, the color rendering index (CRI) may be limited. The CRI increases when more bands of light frequencies, which are used to create the mixed color, are available. For example, if only red, green, and blue light sources are available, only red, green, and blue wavelengths are present. On the other hand, if more than three unique colors are used to create the same mixed color, the CRI increases. However, as described above, since look-up tables limit the number of unique mixed colors that can be created, if four or more colors are mixed to create the mixed color using look-up tables, the amount of memory needed increases. For instance, in a four-color system, which has an 8-bit resolution of intensity control, over four billion unique colors can be created. It would take a lot of memory to store dimming values for four billion colors (e.g., more than 16 gigabytes (GB)) in a look-up table. Also, if only a selected number of colors are used in the look-up table, the total possible number of unique colors that can be created is limited. In the example above, if a 1 MB memory is used, roughly 250,000 unique colors out of the four billion possible can be created.

BRIEF DESCRIPTION OF THE DRAWINGS

The present invention is illustrated by way of example and not by way of limitation in the figures of the accompanying drawings, in which.

DETAILED DESCRIPTION

Figure 1A:
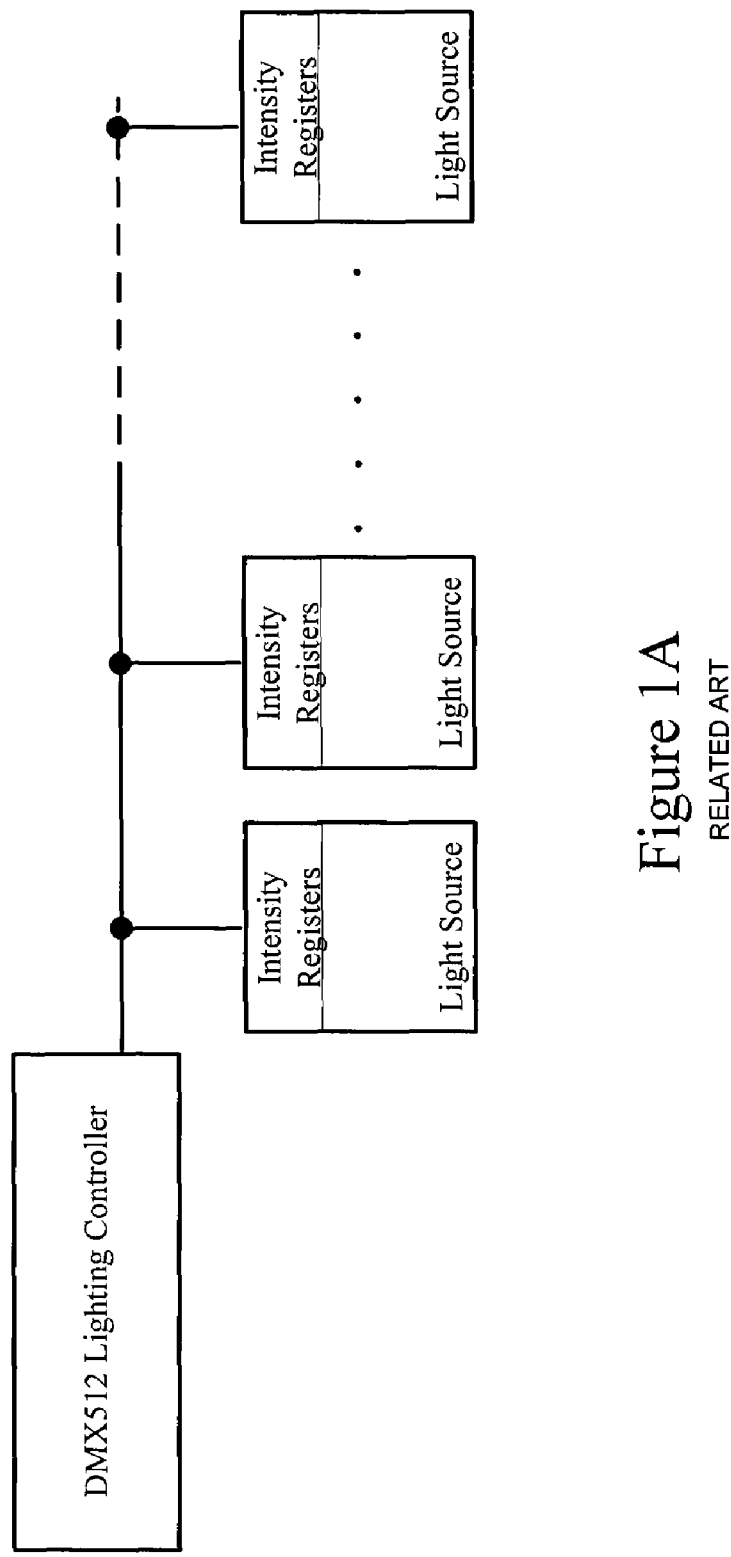
FIG. 1A illustrates a conventional DMX512 lighting network.
Figure 1B:
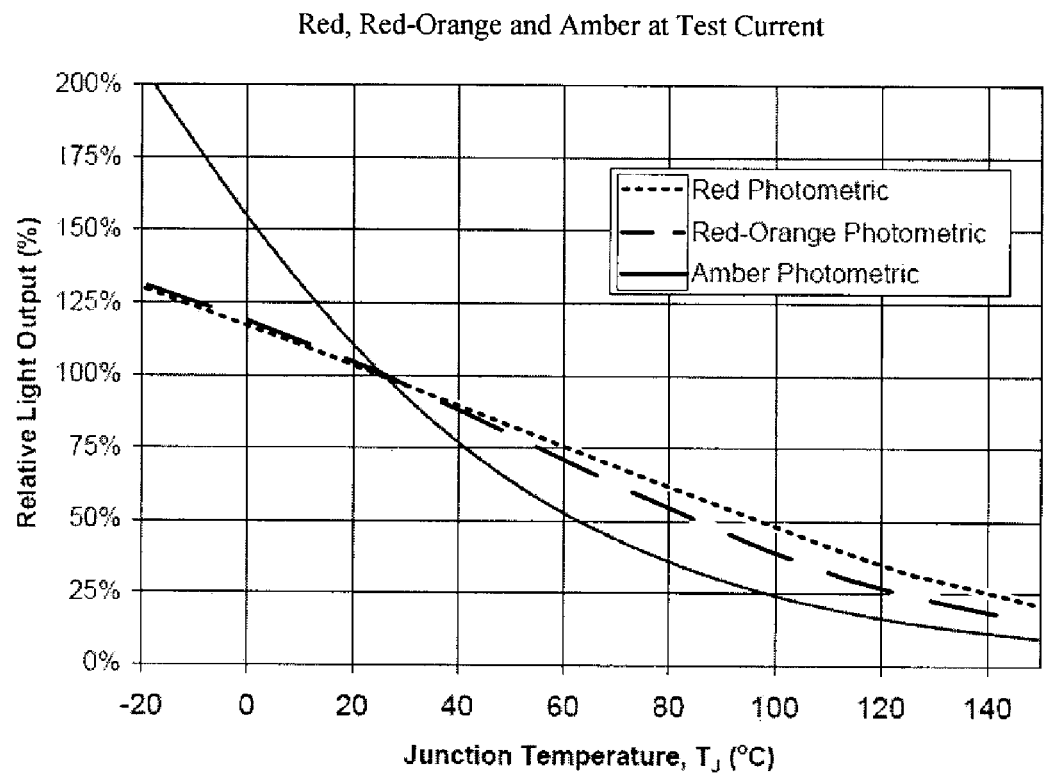
FIG. 1B illustrates the change in the luminous flux of LEDs in a conventional lighting network as the junction temperature of the LED changes.
Figure 1C:
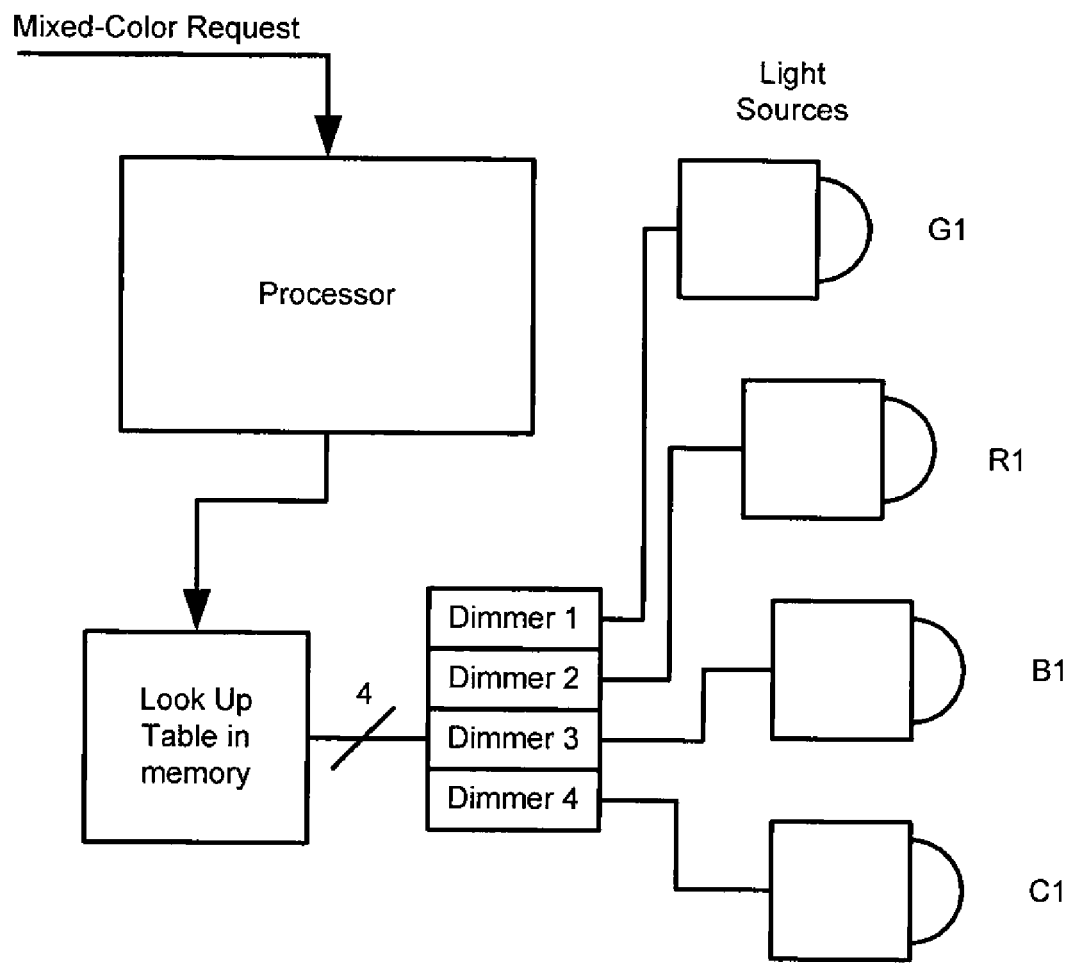
FIG. 1C illustrates a conventional for mixing four colors.

Described herein is a networked lighting apparatus that deterministically calculates dimming values for each of four or more light sources without using a look-up table of the dimming values to generate a color point. The combined output of the four or more light sources generates the color point. The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the spirit and scope of the present invention.

Reference in the description to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

A networked lighting apparatus is described that, in one embodiment, includes circuitry to receive a commanded color point and/or luminous flux value, sensors and circuitry for determining 1) the junction temperatures of the LEDs, and/or 2) the output intensities of four or more LEDs, and/or 3) the output wavelengths of the four or more LEDs, and/or 4) the accumulated operating time of the four or more LEDs, and a processing device that controls the luminous flux of each of the four or more LEDs using the commanded color point and/or luminous flux value, and the junction temperatures of the four or more LEDs and/or intensities of the four or more LEDs and/or the output wavelengths of the four or more LEDs and/or the accumulated operating time of the four or more LEDs.

In one embodiment, the method and apparatus described herein uses a lighting controller to transmit (command) a particular color point specific to a standard color chart and/or a luminous flux value. The luminous flux value may be expressed, for example, as an absolute luminous flux (e.g., 50 lumens) or as a relative luminous flux (e.g., 50% of a maximum level).

The embodiments described herein are directed to four or more color mixing. The four or more color mixing is based upon the methods used for three-color mixing, as described below. Instead of solving for the three dimming values from a color point within a color gamut triangle of a three-color mixing system, the embodiments described herein solve for four or more dimming values using superposition of the dimming values of multiple color gamut triangles of multiple three-color combinations (also referred herein as triplet color combinations) of the four or more light sources. Each of the dimming values of the four or more color gamut triangles are solved, for example, using the methods for three-color mixing, as described below. The embodiments described herein deterministically calculate dimming values for each of the four or more light sources without using a look-up table of the dimming values to generate a color point.

The embodiments described herein are a device used to create colored light outputs based upon color request inputs. Another device specifies a particular color to be created, and the device creates that color. The device may be implemented by a processing device that controls four or more light sources. These light sources each have a different color of light. The processing device is responsible for receiving the mixed color request from some external device, and then determines the intensity at which each of the light sources should be set so that their colors mix to create the requested color at the input. Unlike the conventional systems that use a look-up table to determine the intensity levels, the processing device solves for these intensity levels by deterministically using mathematical functions. The processing device solves for these intensity levels by abstractly dividing up the light sources into triplets (e.g., three-color combinations) of the four or more light sources. Then a function is applied to each triplet that solves for the three dimming values for the three light sources of the triplet that create the requested color. The processing device, unlike conventional three-color mixing systems that determine the dimming values for three light sources, determines the dimming values for four or more light sources.

In one embodiment, a processing device is used to convert target color coordinates into four or more dimming values for light source dimmers. The four or more light sources are of different colors. The processing device calculates what the four or more dimming values should be to accurately create the mixed color that was specified by the input color coordinate. The processing device uses a color mixing algorithm that calculates dimming values for triplets of light sources of the four or more light sources in the system. The dimming values for the triplets are then all added together and scaled correctly for the dimming hardware. As such, the color mixing algorithm uses superposition in conjunction with a function that solves for the dimming values of three light sources.

The embodiments described herein may provide the advantage of having the capability of deterministically solving for the dimming values for all possible color request inputs. The embodiments described herein allow the processing device to perform all dimming value calculations needed to create mixed colors, and allows for the creation of all possible mixed colors without using a large amount of memory. The embodiments described herein deterministically solve for the dimming values without using look-up tables, which must trade off memory usage for the number of possible mixed colors. By deterministically calculating the dimming values for each of the four or more light sources, as compared to two or three color conventional systems, the embodiments described herein may increase the color rendering index (CRI) of the mixed color (e.g., color point) that is created. Also, by deterministically calculating the dimming values for each of the four or more light sources, as compared to two or three color conventional systems, the embodiments described herein may increase a color gamut of the device.

The embodiments described herein may also provide an advantage over the conventional systems because the color mixing described herein is deterministic and takes approximately the same amount of time to compute, regardless of the mixed color request. The color mixing as described herein is not an iterative algorithm, and although the algorithm may be math intensive, the algorithm can be computed using little processing power, for example, the algorithm can be computed in an 8-bit microcontroller with less than 6 MIPs (million instructions per second) of processing power. Also, the embodiments described herein may be very well suited for programmable logic devices, such as, for example, field-programmable gate arrays (FPGAs) or any other device that allows parallel processing, due to the parallel processing nature of the method. Alternatively, other processing devices with different processing power may be used. It should also be noted that the processing time grows linearly with each added light source, rather than growing as a squared or exponential function. Also, in embodiments of program code to execute the algorithm, the program code size grows very little with each added light source. In one embodiment, the method uses fixed point math, which uses less memory, program code size, and processing load than using floating-point math. The embodiments described herein may be used to generate a very large number of colors, since it can generate a solution for any valid (x, y) coordinate that is input into the intelligent light source device.

Figure 2A:
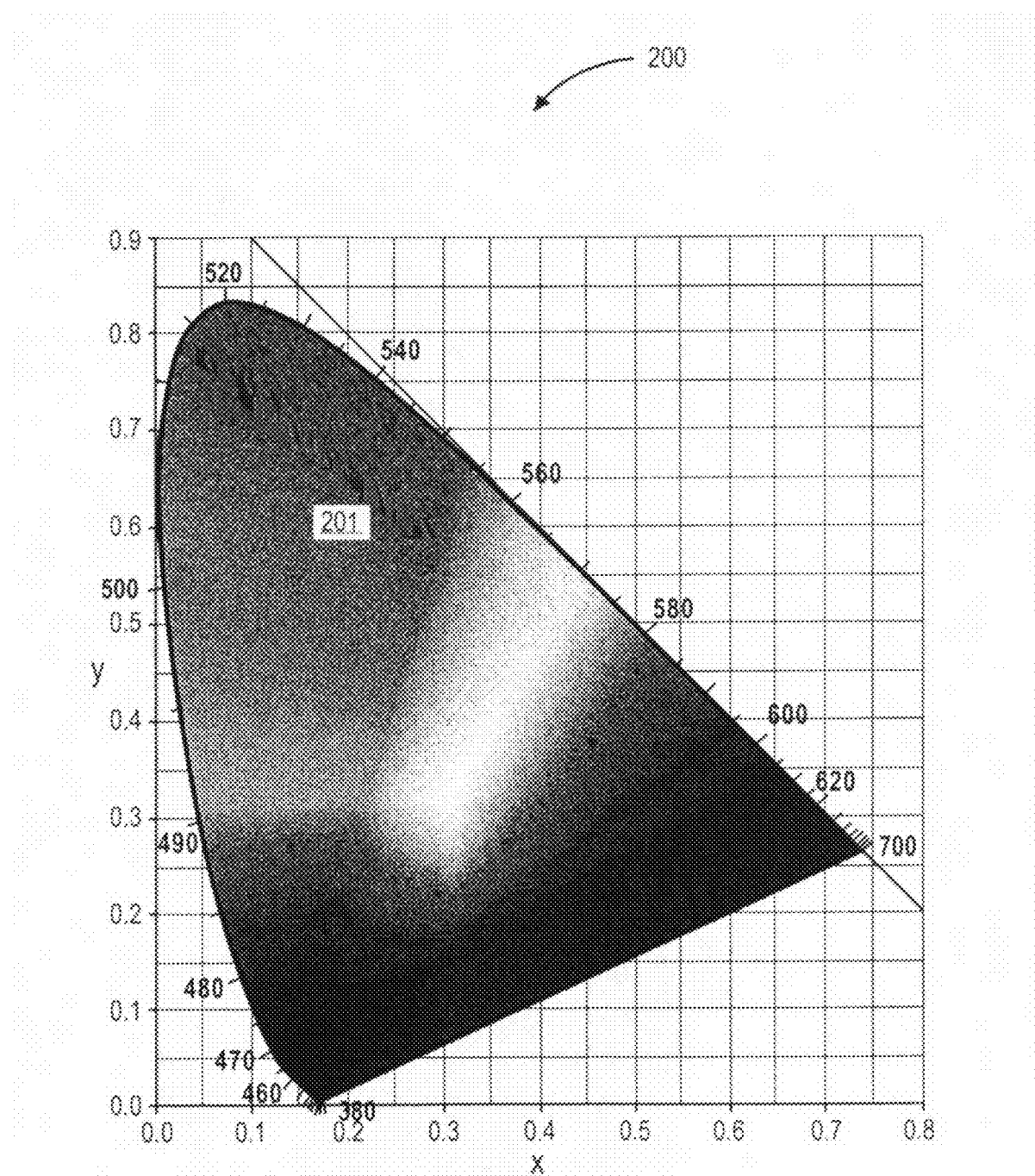
FIG. 2A illustrates a color chart.

An example of a standard color chart 200 (rendered in gray-scale for convenience of illustration) is illustrated in FIG. 2A for the CIE 1931 color space where every visible color point (represented by area 201) within a color gamut determined by a set of three individual color LEDs, can be specified by an x-y coordinate pair corresponding to a specific ratio of luminous intensities of light sources 203, 204, and 205. The luminous flux of a particular color point can be represented by a third coordinate (e.g., a z coordinate) normal to the plane of the color chart. Alternatively, a particular color in the CIE 1931 color space is represented with three values in the form of a vector (x, y, Y). The x and y values, collectively referred to as the (x, y) coordinate, represent the color hue and saturation. Plotting the (x, y) coordinate in the graph of FIG. 2A, obtains a particular shade of color. The third value of the (x, y, Y) vector specifies the luminous flux, in lumens (lm). While the (x, y) coordinate may be dimensionless, the Y value can have units of lumens, or may be expressed as a percentage to signify a relative flux. The Y value cannot be seen in the graph of FIG. 2A, but it is visualized as a vector normal to the page with a magnitude at some (x, y) coordinate. The (x, y, Y) vector describes a light source by denoting its color and its total flux. In one embodiment, the intelligent light source device receives color requests in the form of three values, the (x, y) coordinate represented in the form of two N-bit words (e.g., 16-bit words), for example, where a value of 10,000 would correspond to an x or y value of 1.0. The third Y value may be input as an unsigned byte that specifies the number of total lumens the mixed color must have.

In FIG. 2A, the numbers around the perimeter of area 201 (ranging from 380 to 700) indicate the wavelengths (in nanometers) of monochromatic light sources corresponding to the respective point on the perimeter. The color point and luminous flux values may be represented by digital words of predetermined bit length that may be transmitted by some other device and received by an intelligent light source device as described herein.

From a high level perspective, the color points may be received by the intelligent light source device in CIE 1931 chromaticity coordinate form, and the coordinates are converted into the appropriate dimming values for each of the four or more light sources (e.g., LEDs). A dimming value is simply the percentage of maximum luminous flux to which a light source (e.g., LED) is dimmed. If a light source has its current quickly switched on and off in an intelligent fashion, the light source has its flux output controlled. By correctly converting the chromaticity coordinate into a dimming value for each light source, the combined output of the four or more light sources mix together to create the color of the chromaticity coordinate input into the intelligent light source device.

As described above, the dimming values for the four or more light sources are not stored in a look-up table in memory, but rather are deterministically calculated using superposition and linear algebra. The dimming values are deterministically calculated by solving for the multiple dimming values for each three-color combination of the four or more light sources, and summing the multiple dimming values for each of the three-color combination. The combined output of the four or more light sources generates the requested color point. The dimming values for each three-color combination can be solved using linear algebra, and the dimming values are added using superposition to determine the dimming value for each of the four or more light sources. In one embodiment, the three dimming values for each of the three-color combinations are determined using a three-color mixing equation, and the resulting dimming values are added using superposition to determine the dimming value for each of the four or more light sources.

Figure 2B:
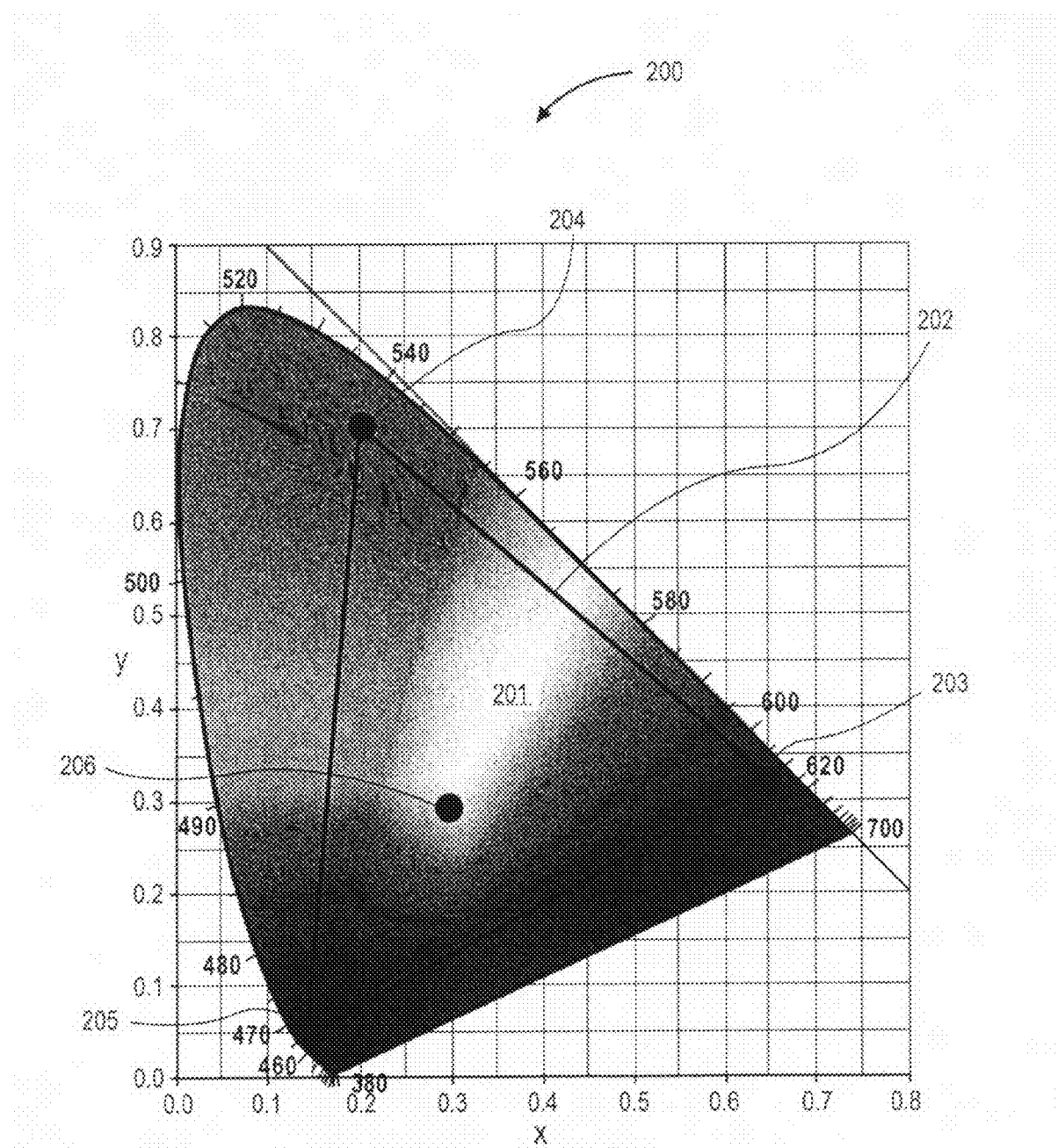
FIG. 2B illustrates a color gamut triangle superimposed on the color chart of FIG. 2A.

FIG. 2B illustrates a color gamut triangle 202 superimposed on the color chart 200 of FIG. 2A. The triangle 202 represents the color gamut of an arbitrary set of red LED 203, green LED 204, and blue LED 205. The area 201 represents the available color points within the color gamut triangle 202, as determined by a set of RGB LEDs. The color points can be specified by an x-y coordinate pair corresponding to a specific R/G/B ratio. The three points of the triangle 202 are the (x, y) coordinates of each respective LED. The area inside the triangle 202 is the gamut of achievable colors with this particular set of three LEDs 203-205. Any (x, y) coordinate, such as illustrated as color point 206, within the triangle is input into the intelligent light source device, providing a broad range and high resolution of unique colors that is produced with this intelligent light source device. It should be noted that if dimming values are pre-stored in a look-up table in memory, the device is limited to the colors within the light sources' gamut that have been predefined in the look-up table.

It should also be noted that this dynamic method of deterministically calculating the dimming values enables the use of feedback. The characteristics of LEDs such as color coordinates, lumen output, and forward voltage change with the junction temperature and lifetime of the LEDs. As such, this method makes it possible to feed back junction temperature or lifetime measurements into the intelligent light source device. The base (x, y) coordinates and lumen ratings of the LEDs may be dynamically adjusted, compensating for environmental changes like ambient temperature, or the like. It should be noted that using the conventional method of look-up table storing the dimming values, feedback of any sort generally becomes unfeasible, because the feedback would require exponentially more memory to store many more look-up tables.

As described above, a three-color mixing equation can be used to determine the dimming values of each of the three-color combinations of the four or more light sources. The following equations describe how the three dimming values for each three-color combination is obtained from one (x, y, Y) vector.

The first step is the creation of a matrix, as shown in equation (1). The color subscript (for example, red) denotes the x or y value of the respective red, green, or blue LEDs in the intelligent light source device. It should be noted that the subscripts, red, green, or blue may be substituted with other colors, such as color 1, color 2, and color 3 for other three-color combinations. The "mix" subscript denotes the x or y value of the input color coordinate request.

$$A = \begin{bmatrix} \frac{x_{red} - x_{mix}}{y_{mix}} & \frac{x_{green} - x_{mix}}{y_{mix}} & \frac{x_{blue} - x_{mix}}{y_{mix}} \\ \frac{y_{red} - y_{mix}}{y_{mix}} & \frac{y_{green} - y_{mix}}{y_{mix}} & \frac{y_{blue} - y_{mix}}{y_{mix}} \\ 1 & 1 & 1 \end{bmatrix} \quad (1)$$

The first mathematical operation is taking an inverse of the matrix above, as seen in equation (2).

$$A' = A^{-1} \quad (2)$$

After the matrix inversion, all the color point data has been solved for and is located in matrix elements $a_{02}$, $a_{12}$, and $a_{22}$. The next step is to factor in the total flux information (e.g., Y) of that color. This is done according to the matrix multiplication as represented in equation (3).

$$\begin{bmatrix} Y_{red} \\ Y_{green} \\ Y_{blue} \end{bmatrix} = A' * \begin{bmatrix} 0 \\ 0 \\ Y_{mix} \end{bmatrix} \quad (3)$$

The value of $Y_{mix}$ is the number of lumens that the total mixed light output should produce. As described above, the Y values can be normalized to 1, as expressed in the following equations (4) and (5).

$$\begin{bmatrix} Y_{red} \\ Y_{green} \\ Y_{blue} \end{bmatrix} = A' * \begin{bmatrix} 0 \\ 0 \\ 1 \end{bmatrix} \quad (4)$$

$$\begin{bmatrix} Y_{norm,red} \\ Y_{norm,green} \\ Y_{norm,blue} \end{bmatrix} = \begin{bmatrix} Y_{red} \\ Y_{green} \\ Y_{blue} \end{bmatrix} * \frac{1}{Y_{max}} \quad (5)$$

In equation (5), $Y_{max}$ is equal to the largest of $Y_{red}$, $Y_{green}$, and $Y_{blue}$. The resultant Y values of the product are the lumen output of each respective LED that is necessary to create the requested color and flux (normalized or unnormalized). It should be noted that when using this method, the math operations give rise to two benefits. First, if any of the elements $a'_{02}$, $a'_{12}$, or $a'_{22}$ in matrix A' of equation (2) are negative, it signifies that the color coordinate that was requested is invalid and that the LEDs that are in the intelligent light source device cannot create that color because the requested color is outside the gamut (e.g., triangle 202) of the LEDs. The second benefit may be that if any of the product's Y values are larger than the maximum lumen output of any of the three LEDs, then the $Y_{mix}$ input was too large, and the LEDs in the intelligent light source device cannot create that much total flux at the given (x, y) coordinate. If the (x, y) coordinate is invalid, the intelligent light source device can turn off the LEDs and report an error. If the requested flux is too large, the intelligent light source device can scale back the values so that they produce the maximum possible flux at the requested (x, y) coordinate.

Equation (6) expresses how a dimming value is produced from the $Y_{red}$ value, however, the exact same equation would also apply to the other colors. The $Y_{max,red}$ value is the lumens that the red LED has if it is not dimmed at all, which is its maximum flux. N is the number of bits of resolution of the hardware dimming circuitry.

$$DimValue_{red} = \frac{Y_{norm,red}}{Y_{max,red}} * (2^N - 1) \quad (6)$$

The above process is repeated for each three-color combination, and the resulting dimming values of each of the three-color combinations are added together using superposition. For example, the equation (7) includes an example of one of individual colors of the multiple three-color combinations added together using superposition.

$$DimValue_{red,total} = \sum_{N}^{i=1} DimValue_{red,i} \quad (7)$$

where N is the total number of valid triplet color combinations, where $DimValue_{red,i}$ is the valid dimming value for red light source (e.g., first color light source) of a particular triangle i, and $DimValue_{red,total}$ is the total dimming value for the red light source. Subsequently, the valid dimming values for the other light sources of the triplet color combinations are similarly added together.

For example, an intelligent light source device having four light sources, red, green, blue, and cyan, deterministically calculates the dimming values for a first three-color combination, such as red (R), green (G), and blue (B) as described above, and then determines the dimming values for the other three-color combinations, such as GBC, GRC, and RBC, if they have valid solutions. Once the dimming values are determined for each of the valid three-color combinations, the valid dimming values are added using superposition. Although the embodiments described above describe an intelligent light source device having four light sources of red, green, blue, and cyan, alternatively, other colors may be used, and more than four light sources can be used.

Figure 3A:
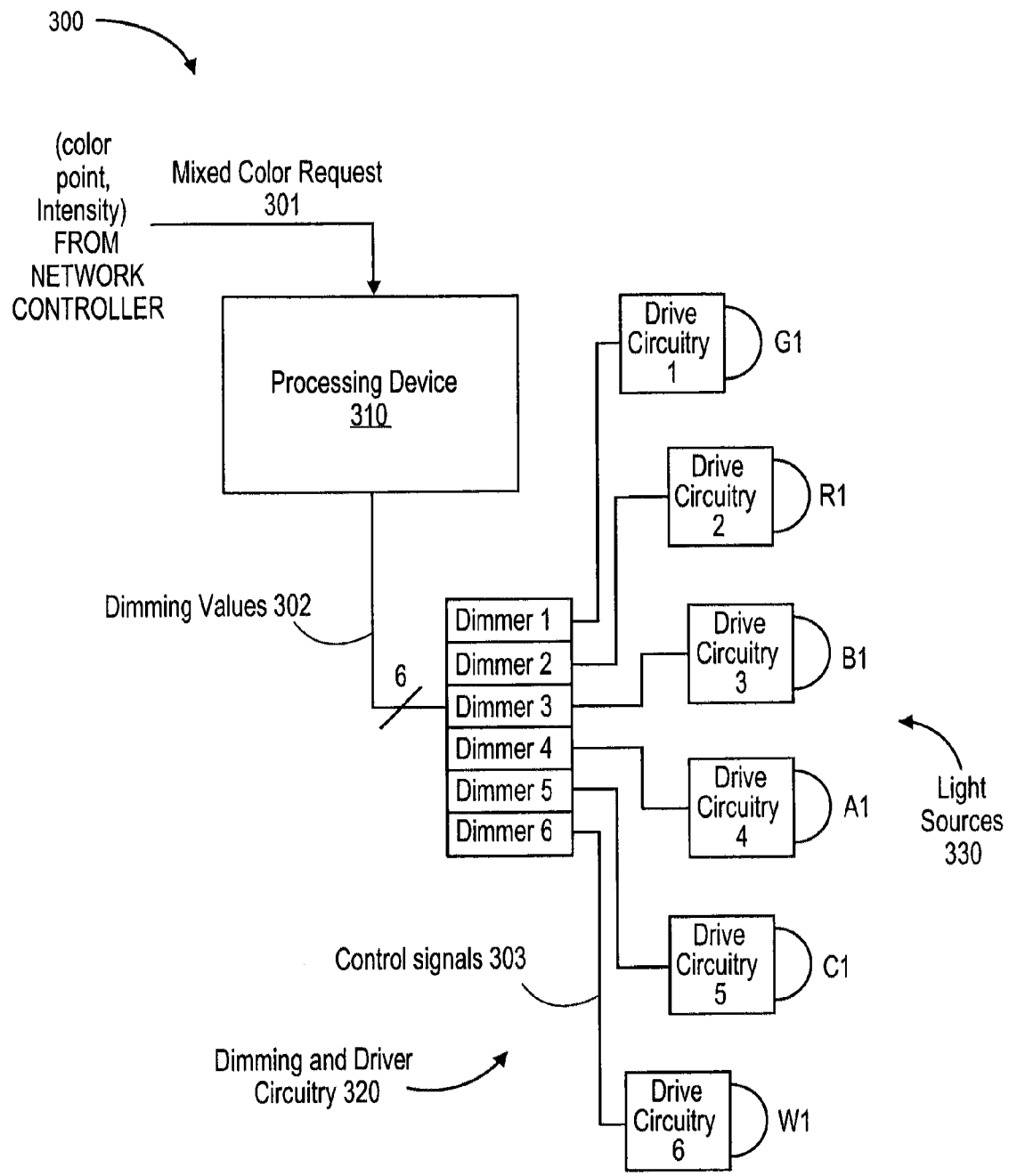
FIG. 3A illustrates one embodiment of an intelligent light source device for mixing six colors.

FIG. 3A illustrates one embodiment of an intelligent light source device 300 for mixing six colors. In this embodiment, the intelligent light source device 300 includes three functional blocks. First, the intelligent light source device 300 includes a processing device 310 that receives any color coordinate (e.g., mixed color request 301 and uses a mathematical algorithm to deterministically solve for the dimming values 302 that should be applied to the light sources 330. The second functional block is the dimming and driver circuitry 320 for the light sources 330. This block is responsible for driving the light sources 330 with the appropriate current and/or voltage, and attenuating that current and/or voltage to dim the light output in response to the dimming values 302 generated by the processing device 310. The final functional block is the light sources 330 themselves.

Although this embodiment includes six light sources, in other embodiments, there may be four or more light sources. There are four or more unique colors generated by the respective light sources. The construction of this intelligent light source device could take many different specific forms while keeping the same general functional blocks. The improvement with this method is that the math function for solving for the dimming values of three colors is leveraged to solve for the dimming values of any number of colors to be mixed. Also, large look-up tables do not need to be used, leading to less ROM/flash usage and allowing environmental variable feedback. Also, the full range of possible colors can be solved for and mixed, rather than a subset that is offered by the look-up table. Finally, adding more than three unique colors to the intelligent light source device improves the color gamut (mixed color range) and the color-rendering index (CRI) of the total mixed color output.

Mixed color requests 301 are input into the processing device 310 in the form of color coordinates and relative or absolute intensity. The processing device 310 solves for the four or more dimming values 302 necessary to create the requested mixed color 301. The processing device 310 passes the dimming values 302 on to the dimmer circuits. These dimmers generate signals that will cause the driver circuits to dim the light output of the light sources 330. The driver circuits and the light sources themselves have been combined into the same blocks in FIG. 3A, however, in other embodiments, these may be separated. In one embodiment, the dimmers circuits are digital dimmer circuits. In another embodiment, the dimmers circuits are analog dimmer circuits. The digital dimmer circuits may include a signal density modulator, such as SSDM, PWM, sigma-delta modulators, sigma-delta modulated PWM, or the like.

The processing device 310 is responsible for receiving and decoding data that specifies a color to be created. The processing device 310 then solves for each dimming value 302 needed for each light source so that the combined output of the four or more light sources creates the mixed color that was requested. As described herein, the processing device 310 solves for each dimming value 302 for each of the four or more light sources using linear algebra and superposition. The processing device 310 abstractly groups the light sources into triplets. The processing device 310 then uses a linear algebra equation to solve for the three dimming values needed for each of the three light sources of each triplet that has a valid solution. Then, all of the valid dimming values of each of the triplets are added together using the processing device 310. The aggregated dimming values are scaled to a suitable data size. The aggregated dimming values may be scaled based on the resolution of the dimming and driver circuitry 320. Using a dimming value for each light source in the intelligent light source device, the light sources 330 create the correct mixed color that was requested.

The dimming and driver circuitry 320 includes two types of circuitry, dimming circuitry and the drive circuitry. The dimming circuitry, illustrated as dimmers 1-6 in FIG. 3A, generate electrical control signals 303 that correspond with the dimming value 302 generated by the processing device 310. The drive circuitry, illustrated as drive circuitry 1-6 in FIG. 3A, drive the current or voltage for the light sources 330. The light sources 330 may have a high power rating, therefore they may include dedicated circuits to drive the light sources with the correct amount of current or voltage. These driver circuits drive the current or voltage to correspond with the control signals 303 that are received from the dimming circuits. In this embodiment, the dimming circuitry and the drive circuitry are illustrated as separated circuitry. In other embodiments, the dimming and drive circuitry may be combined into the same circuitry. In other embodiments, the light sources 330 may not have high power ratings, and the driver circuits could be omitted, allowing the dimmer circuits to directly control the light sources. Alternatively, other configurations are possible to control the light sources based on the deterministically calculated dimming values.

The light sources 330 are devices that emit colored light when stimulated with voltage or current. The light sources 330 are controlled by the drive circuitry of the dimming and driver circuitry 320.

Figure 3B:
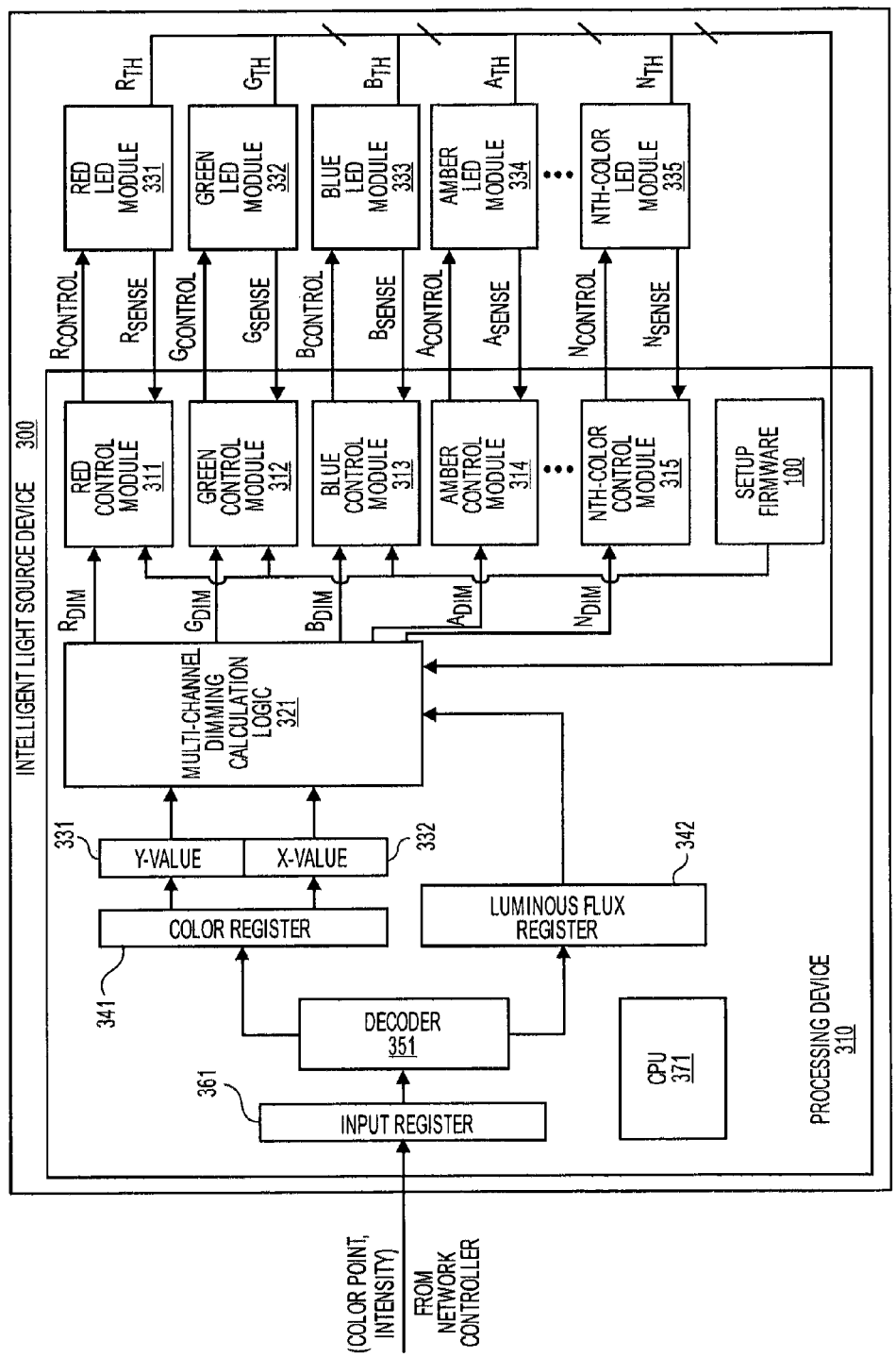
FIG. 3B illustrates one embodiment of an intelligent light source device.

FIG. 3B illustrates one embodiment of an intelligent light source device 300. In one embodiment, the intelligent light source device 300 is composed of four or more illumination devices (e.g., red LED module 331, green LED module 332, blue LED module 333, amber LED module 334, and Nth-color LED module 335), a processing device 310 including illumination device drivers (e.g., red control module 311, green control module 312, blue control module 313, amber control module 314, and Nth-color control module 315). In one embodiment, the illumination devices may include environmental and/or optical sensors as described in greater detail below. In one embodiment, the processing device is a microcontroller and may include a central processing unit (CPU) 371 to control the operations of the processing device 310. Alternatively, other types of processing devices may be used.

The intelligent light source device 300 may be capable of monitoring/measuring environmental variables such as junction temperature(s) and/or ambient temperature and/or LED operating age, and LED output parameters such as wavelength and/or luminous flux, and setting the correct luminous flux of each LED (or group of like-colored LEDs) to compensate for the environmental changes and output variations to achieve the desired color point and/or luminous flux commanded by the lighting controller. These monitoring/measuring and control functions may be achieved with various feedback control networks as described below.

The intelligent light source device 300 receives network data from a controller on the lighting network (not shown in FIG. 3B) that specifies the coordinates of a color point in a standardized color space, and/or a corresponding total luminous flux of the light source. The color point and total luminous flux data (e.g., representative of the mixed color request 301) are converted to control signals for different color LEDs such that the combined outputs of the LEDs produce the desired color and/or luminous flux. In one embodiment of the present invention, the lighting controller is coupled to the intelligent light source device 300 using a wired communication protocol. Standard wired lighting protocols that may be used include, for example, DMX512 and RDM. In one embodiment, the intelligent light source device 300 may be coupled to the lighting controller using a wireless communication protocol such as, for example, Zigbee®, WirelessUSB™ (WUSB), available from Cypress Semiconductor, Corporation of San Jose, Calif., or the like.

The network data (color point and/or total luminous flux) is received by an input register 361 in the intelligent light source device 300. The data is decoded in a decoder 351 and sent to respective color register 341 and total luminous flux register 342. The data in the color register is further separated into x and y coordinate values (in registers 332 and 331, respectively) of a standard color space, such as the CIE 1931 color space. The x coordinate from register 332, they coordinate from register 331, and the total luminous flux value from the total luminous flux register 342 are sent to a multi-channel dimming calculation logic 321 (e.g., four or more color mixing stage). In one embodiment, the multi-channel dimming calculation logic 321 may be implemented as a firmware algorithm in the above referenced processing device 310. Alternatively, the multi-channel dimming calculation logic 321 may be implemented in hardware, software, or a combination thereof. As described herein, instead of using the x and y coordinates as entry points into the look-up table, x and y coordinates are used in deterministically calculating the dimming values for multiple three-color combinations (e.g., triplets) of four or more light sources, as described herein.

In the exemplary case of four color mixing, such as RGBA, the multi-channel dimming calculation logic 321 may generate digital RGBA values that corresponds to the color point, and may be used in conjunction with the total luminous flux value to generate digital dimming values (e.g., absolute or relative luminous flux values) for each color LED module (e.g., $R_{DIM}$, $G_{DIM}$, $B_{DIM}$, $A_{DIM}$), such that the combination will produce the desired overall color and total luminous flux. The digital dimming values are converted to analog or digital control signals (e.g., $R_{CONTROL}$, $G_{CONTROL}$, $B_{CONTROL}$, $A_{CONTROL}$) in a respective LED control module (e.g., red control module 311, green control module 312, blue control module 313, and amber control module 314) that control the peak and average currents of the LED Modules (e.g., red, green, blue, and amber LED modules 331, 332 333, and 334) as described below. Current and voltage sensing in each LED module may provide feedback (e.g., $R_{SENSE}$, $G_{SENSE}$ and $B_{SENSE}$) to its respective control module to maintain the required peak current values. As described in greater detail below, a setup firmware module 100 may provide setup values to control modules 311-315 that configure the operation of the control modules. The setup values may include peak current values for the LED modules and initial values for pseudorandom number generators in the LED control modules as described below. In one embodiment, the setup firmware may be a one-time programmable (OTP) module that may be externally programmed during an initial setup operation of the intelligent light source device 300. In one embodiment, the setup firmware may be reprogrammable.

Although the embodiment above is described as using four colors, namely red, green, blue, and amber, alternatively, in other embodiments, other four color combinations may be used, as well as more than four color combinations may be used, as illustrated in FIG. 3B using the digital dimming value $N_{DIM}$ value, Nth-color control module 315, $N_{CONTROL}$ signal, $N_{SENSE}$ signal, the Nth-color LED module 335, and the like.

Figure 4A:
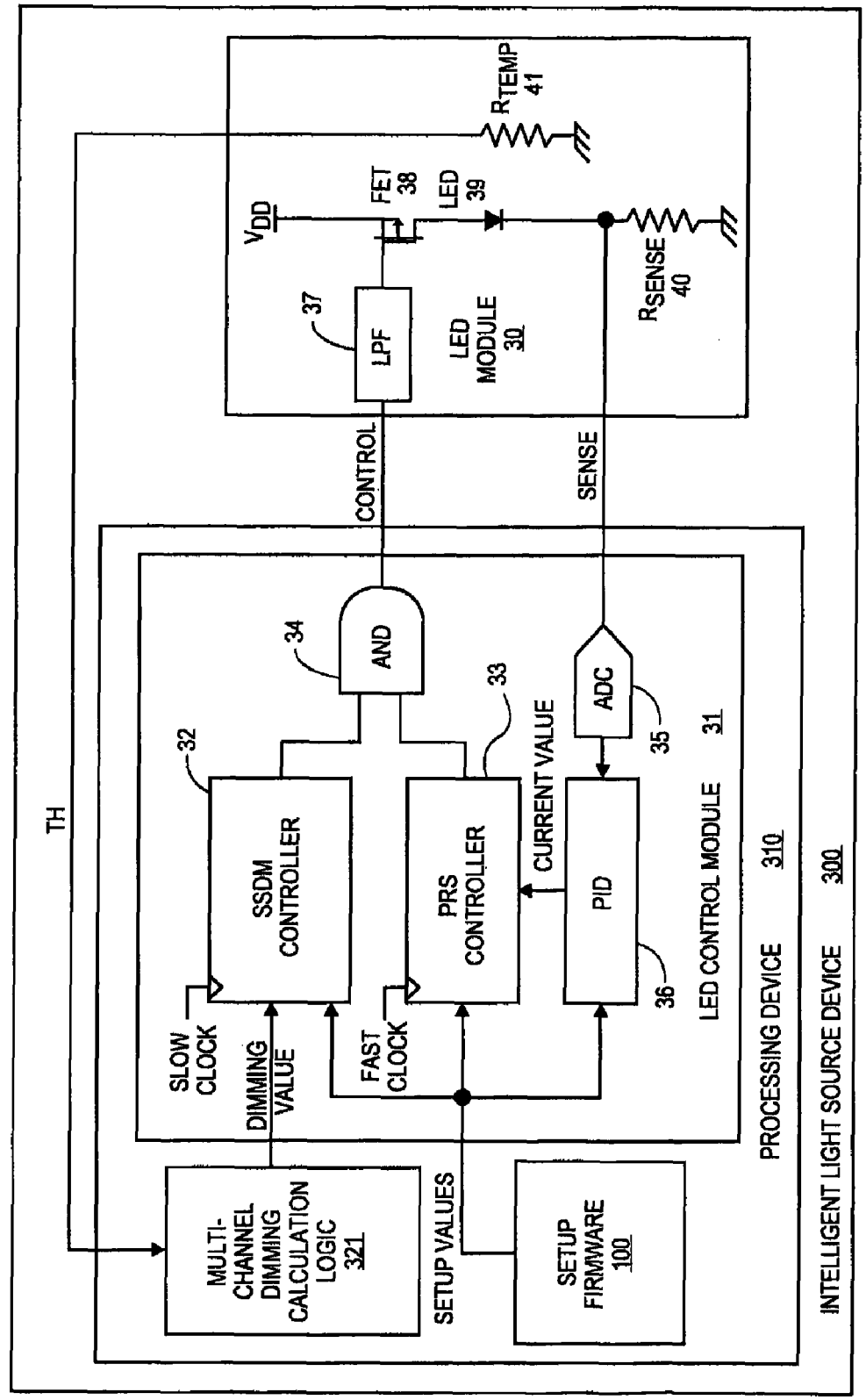
FIG. 4A illustrates an LED control module and an LED module with associated circuitry of an intelligent light source device in one embodiment of the present invention.

FIG. 4A illustrates an exemplary LED module 30 and an exemplary LED control module 31 with associated circuitry of an intelligent light source device according to one embodiment of the present invention. In this embodiment, the LED control module 31 includes a stochastic signal density modulation (SSDM) dimming circuit ("SSDM Controller") 32 that receives a digital dimming value from the multi-channel dimming calculation logic 321 and generates a waveform that controls the average LED current of LED 39 in LED module 30. In this embodiment, the LED control module 31 also includes a pseudorandom sequence (PRS) current control circuit ("PRS Controller") 33 that generates a waveform to control the peak current in LED 39. The SSDM Controller 32 and the PRS Controller 33 are programmed with waveform setup values by the setup firmware 100 during an initial setup operation. The LED control module also includes a Proportional Controller 36 that may be programmed with a peak current value by the setup firmware 100 during the initial setup operation. In another embodiment, the LED control module may include a controller that provides a full controller that includes proportional, integral, derivative terms in the transfer function, such as in a Proportional, Integral, Derivative (PID) controller. The PID Controller 36 may be connected to an analog-to-digital converter (ADC) 35 that digitizes a SENSE signal (e.g., $R_{SENSE}$, $G_{SENSE}$ and/or $B_{SENSE}$) from the LED module 30, which may be an LED current sensing voltage, in a feedback control circuit, described below.

The outputs of the SSDM Controller 32 and the PRS Controller 33 may be logically AND'd by AND gate 34 and passed through a low-pass filter/biasing network (LPF) 37 to generate a control signal that is used to control and modulate current in LED 39. The SSDM controller 32 may be clocked at a 'slow' clock frequency (e.g., a kilohertz rate) that is below a nominal cutoff frequency of the LPF 37. The PRS Controller may be clocked at a 'fast' clock frequency (e.g., a megahertz rate) that is above the nominal cutoff frequency of the LPF. As described below, the outputs of both the SSDM Controller 32 and the PRS Controller 33 may be stochastic and characterized by spread-spectrum (i.e., non-uniform frequency) waveforms.

In one embodiment, the SSDM controller 32 includes an n-bit stochastic counter, an n-bit signal density register, and a comparator. The stochastic counter may include an n-bit polynomial register that receives a setup value (polynomial value) from the setup firmware 100. The stochastic counter may also include an n-bit linear feedback shift register (LFSR) configured as an n-bit pseudorandom number generator that generates pseudorandom numbers between 1 and $2^n-1$ at a rate equal to $f_{clock}$ (where $f_{clock}$=slow clock). The stochastic counter may also include an output register to hold the pseudorandom number outputs of LFSR for comparison with an output of signal density register.

The polynomial value in the polynomial register may configure the linear feedback shift register (LFSR) and initializes (seeds) the pseudorandom sequence that is generated by the LFSR. The polynomial value may be programmed into the setup firmware 100 during an initial setup operation.

The value in the polynomial register may correspond to the coefficients of a polynomial equation that configures the LFSR. A linear feedback shift register, in one embodiment, is a shift register with tap points and one or more exclusive-or (XOR) gates that determine the next value in the shift register when the register is clocked by a clock signal, such as $f_{clock}$.

For example, a 4-bit LFSR is characterized by a polynomial equation of the form $ax^4+bx^3+cx^2+dx+1$, where a, b, c, and d are equal to either 1 or 0. A coefficient of 1 for the $x^n$ term indicates that the $n^{th}$ bit position in the shift register is tapped. Conversely, a coefficient of 0 indicates that the corresponding bit position is not tapped.

Each time the LFSR is clocked, bits 1 and 2 are shifted right, bit 3 is shifted to the XOR gate, the XOR value is shifted to bit 4 and bit 4 is fed back to the XOR gate and to bit 1. The pseudorandom number generator is initialized with a seed value that is provided by the setup firmware 100 through the signal density register.

Each time the state of the LFSR changes, the new value is transferred to the output register, where it is compared with an n-bit dimming value in the signal density register. The signal density register in the SSDM Controller 32 receives the n-bit dimming value between 0 and $2^{11}-1$ from the multi-channel dimming calculation logic 321, which represents a desired average value (e.g., in the range of 0% to 100%) of the output waveform of the SSDM Controller 32 corresponding to an average LED current (e.g. through LED 39). The n-bit dimming value in the signal density register is compared with the n-bit output of the stochastic counter. When the output value of the stochastic counter is at or above the output value of the signal density register, the output of the comparator is in a first state (e.g., a logical "1). When the output value of the stochastic counter is below the output value of the signal density register, the output of the comparator is in a second state (e.g., a logical "0"). It will be appreciated that different definitions of "first state" and "second state" are possible, depending on a particular choice of logic notation, without affecting the principles of operation of the present invention. As a result, the output of the comparator is a stochastic (pseudorandom) waveform with a code length of $2^n-1$, a clock rate of $f_{lock}$=slow clock, and a period of $2^n/f_{clock}$.

The PRS Controller 33 and associated circuitry in the intelligent light source device 300 may include separate instances of an n-bit stochastic counter, an n-bit signal density register, and a comparator as described above with respect to the SSDM Controller 32, which may have equivalent structure and function, but may generate different values depending on, for example, a particular polynomial or other programming variable (e.g. a peak current value as described below). It will be appreciated that while the stochastic counter in SSDM Controller 32 may be structurally equivalent to the stochastic counter in PRS Controller 33, the two stochastic counters may be clocked at different clock rates (e.g., "fast clock" and "slow clock") and can be independently programmed with different polynomial values and seed values during the initial setup operation.

The signal density register in the PRS Controller 33 contains an n-bit current value between 0 and $2^n-1$, which represents a desired average value (e.g., 0% to 100%) of the output waveform of the PRS Controller 33 corresponding to a peak LED current (e.g., through LED 39). The n-bit current value in the signal density register is set by the Proportional Controller 36, which is programmed with a peak current value by the setup firmware 100 during the initial setup operation, as one of the setup values. In one embodiment, as in the case of the polynomial values, the peak current is only programmed into the Proportional Controller 36 a single time.

In operation, the Proportional Controller 36 compares a programmed n-bit peak current value with the output of ADC 35. The output of ADC 35 is a digital representation of an analog sense voltage from LED Module 30 that is proportional to LED peak current. If the output value of the ADC 35 is below the n-bit peak current value in the Proportional Controller 36, the Proportional Controller 36 increases the n-bit current value in the signal density register. If the output value of the ADC 35 is above the n-bit peak current value, then the Proportional Controller 36 decreases the n-bit current value in the signal density register.

The n-bit current value in the signal density register (which is set by Proportional Controller 36) is compared with the n-bit output of the stochastic counter. When the output value of the stochastic counter is at or above the value in the signal density register, the output of the comparator is in a first state. When the output value of the stochastic counter is below the value in the signal density register, the output of the comparator is in a second state. Note that the comments above with respect to the SSDM Controller and the arbitrary definition of logic states applies equally to the PRS Controller, here.

As a result, the output of the comparator in PRS Controller 33 is a stochastic (pseudorandom) waveform with a code length of $2^n-1$, a clock rate of $f_{clock}$=fast clock, and a period of $2^n/f_{clock}$. As in the case of the SSDM Controller 32, the waveform has a multiplicity of pseudorandom pulse widths within each period and a distributed, non-uniform frequency content with a higher average frequency due to the increased clock rate.

As described above (referring to FIG. 4A), the output waveform of the SSDM Controller 32 and the output waveform of the PRS Controller 33 are logically AND'd by AND-gate 34 to generate an LED control signal. In one embodiment, the LED control signal may be connected to the gate of a MOSFET 38 (or other current control element as is known in the art) through a low-pass filter (LPF) 37. The drain of the MOSFET 38 is connected to a power source $V_{DD}$, and the source terminal of the MOSFET 38 is connected to the anode of LED 39 (LED 39 may be a single LED in one embodiment or combination of multiple LEDs having an anodic terminal connected to the source terminal of MOSFET 38). The cathode of the LED (or the cathodic terminal of a combination of LEDs) is coupled to ground through a current sensing resistor $R_{SENSE}$ 40.

The voltage developed across $R_{SENSE}$ 40 is proportional to the current through LED 39 and may be used in a feedback loop through ADC 35. The MOSFET 38 that controls the LED current is located between the power supply and the anode of LED 39. In this configuration, the MOSFET 38 operates as a current source for LED 39 and the cathode of LED 39 can be referenced to ground through the sense resistor $R_{SENSE}$ 40. As described above, this allows the peak current through LED 39 to be controlled via the feedback of a sense voltage to ADC 35 in LED Control Module 31 in intelligent light source device 300.

In one embodiment, a thermistor $R_{TEMP}$ 41 may be thermally coupled with LED 39 (via a known thermal resistance and/or thermal time constant) such that the temperature of $R_{TEMP}$ 41 and the junction temperature of LED 39 have a known relationship. The resistance of $R_{TEMP}$ 41 is proportional to the temperature of LED 39 and may be used, with the LED current and forward voltage sensing, to determine the junction temperature of the LED. A signal (TH) from $R_{TEMP}$ 41 may be used by the multi-channel dimming calculation logic 321 to compensate the SSDM dimming values for luminous flux changes due to temperature to maintain the required intensities of the four or more LED modules (i.e., at the correct ratio to maintain color and at the correct luminous flux levels to maintain total luminous flux).

In another embodiment, the LED Module 30 may include a color sensor, which may be optically coupled to LED 39 (e.g., via a fiber optic light pipe or other means for optical coupling as is known in the art). The color sensor may be, for example, a single-channel or multi-channel color sensor (e.g., a TCS230 color sensor manufactured by Texas Advanced Optoelectronic Solutions), which may have one or more color filtered channels (e.g., red, green, blue and clear) that may generate a color signal indicative of the color content (e.g., red, green and blue content) of an LED output, as well as an unfiltered channel to generate a luminous flux signal indicative of the luminous flux of the LED output irrespective of color. The color/luminous flux signal output of color sensor may be fed back to the multi-channel dimming calculation logic 321 for correction of the dimming values provided to SSDM controller 32 to compensate for temperature and aging effects on the dominant wavelength and luminous flux of the LEDs described above.

In operation, the control signal output of LED control Module 31 may be viewed as the logical multiplication of the output waveform of PRS Controller 33 ("PRS waveform") and the output waveform of SSDM Controller 32 "SSDM waveform"). The PRS waveform is low-pass filtered by LPF 37 to produce a control voltage that sets the linear operating point of MOSFET 38 to establish the peak current through the LED. The SSDM waveform, being below the cutoff frequency of LPF 37, passes through LPF 37 without filtering and operates as a switching control voltage that at the gate of MOSFET 38 that sets the average current through LED 39. Additionally, the location of MOSFET 38 with respect to LED 39 makes it easier to turn the MOSFET 38 on and off because the control voltage at the gate of the MOSFET switch does not have to overcome a large source voltage.

In other embodiments, the LED control module 31 may include other types of circuits than SSDM and PRS controllers that can perform LED average flux control methods that receive dimming values from the multi-channel dimming calculation logic 321 and generate a corresponding control signal to be provided to the LED module 30, such as, for example, PWM circuits, sigma-delta modulator circuits, sigma-delta modulated PWM circuits, analog dimming circuits, or the like. In general, any circuit that can be controlled to modulate the signal density of an LED control signal in either a linear or non-linear fashion may be used. Generally, signal density modulation includes receiving a stored input signal, such as a digital or analog value, and providing an output signal that is a signal that is asserted high for an equivalent amount of time corresponding to the input value (e.g., percentage of high time equal to the percentage of the input value). For example, equation (8) represents an arbitrary square-wave signal.

$$s(t)=A(d(t)-k) \tag{8}$$

The d(t) function is an arbitrary, continuous-time, digital signal. This function (d(t)) can have any arbitrary number of transitions between 0 and 1, and the time between these transitions is arbitrary. Therefore, d(t) has the value of 0 or 1 at any given point in time. The term A is some magnitude of the signal, and k is some offset from zero. Equation (9) represents a mathematical equation that calculates the signal density of a signal.

$$SignalDensity = \frac{1}{AT}\int_0^T s(t)dt \tag{9}$$

The k term is any value from 0 to 1, inclusive. For example for a 50% duty cycle PWM signal with a voltage that is either 0 or 5 volts, A is 5 volts, k is 0, and d(t) will be 1 for half of the time period T. In this example, the equation (9) becomes the following equation (10):

$$SignalDensity = \frac{1}{5T}\int_0^T 5(d(t))dt \tag{10}$$

The integral of 5d(t) will be 2.5 time T in this case, this equation simplifies further to be represented in the following equation (11):

$$SignalDensity = \frac{1}{5T}(2.5)T = 0.5 \tag{11}$$

The signal density will always be between 0 and 1, inclusive, for a k of zero. If k is non-zero, the signal density can be negative. This equation is completely independent from the magnitude, A, of the signal. Note that A multiplied by the signal density will give the average voltage of the signal over any given time T. In other embodiments, other mathematical equations may be used to represent and calculate the signal density of the signal.

Figure 4B:
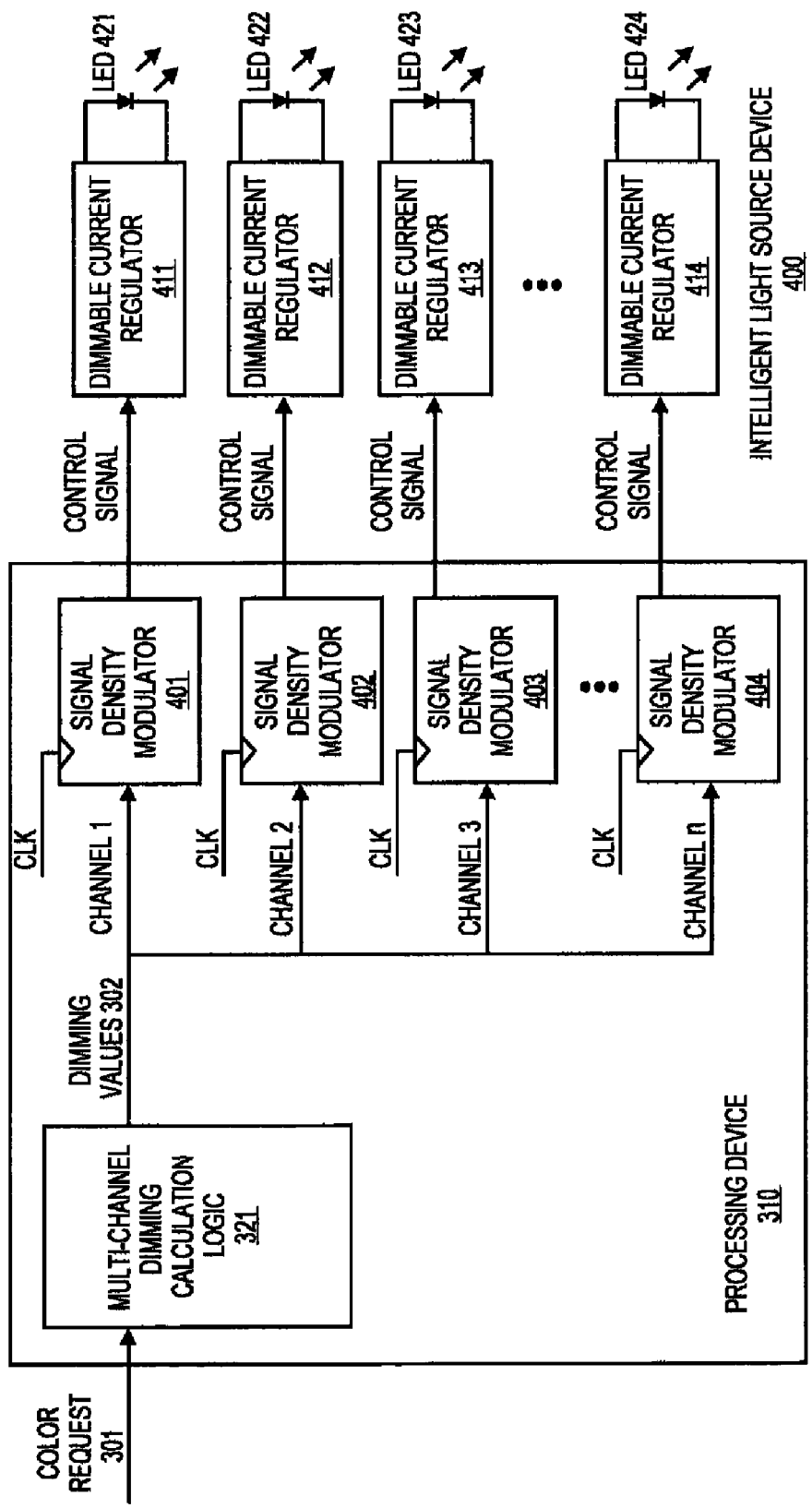
FIG. 4B illustrates an LED control module and an LED module with associated circuitry of an intelligent light source device in another embodiment of the present invention.

FIG. 4B illustrates an LED control module and an LED module with associated circuitry of an intelligent light source device in another embodiment of the present invention. The intelligent light source device 400 also includes four or more channels, however, instead of using SSDM control signals, the processing device 310 includes a signal density modulator (e.g., PWM, sigma-delta modulator, or the like) (e.g., 401-404) and a dimmable current regulator (e.g., 411-414) for each channel. The multi-channel dimming calculation logic 321 receives a color request and deterministically calculates the dimming values 302 for each of the four or more channels. In each channel, a signal density modulator receives the corresponding dimming value 302 and generates a corresponding control signal to control the dimmable current regulator 411. The dimmable current regulator 411, using the received control signal drives the current on the respective LED (e.g., 421-424) on the particular channel. In one embodiment, the signal density modulators 401-404 include PWM to each generate the respective control signal to the dimmable current regulator (e.g., 411-414). Alternatively, the signal density modulator includes other types of signal generator circuits than PWM to generate the respective control signal, such as digital signal density modulator, analog signal density modulators, or the like.

Although the embodiments above describe control signals generated using either SSDM or PWM, in other embodiments, the controls signals can be generated using other types of circuits to control the light sources (e.g., LEDs), such as analog dimming signal, or the like.

Figure 5:
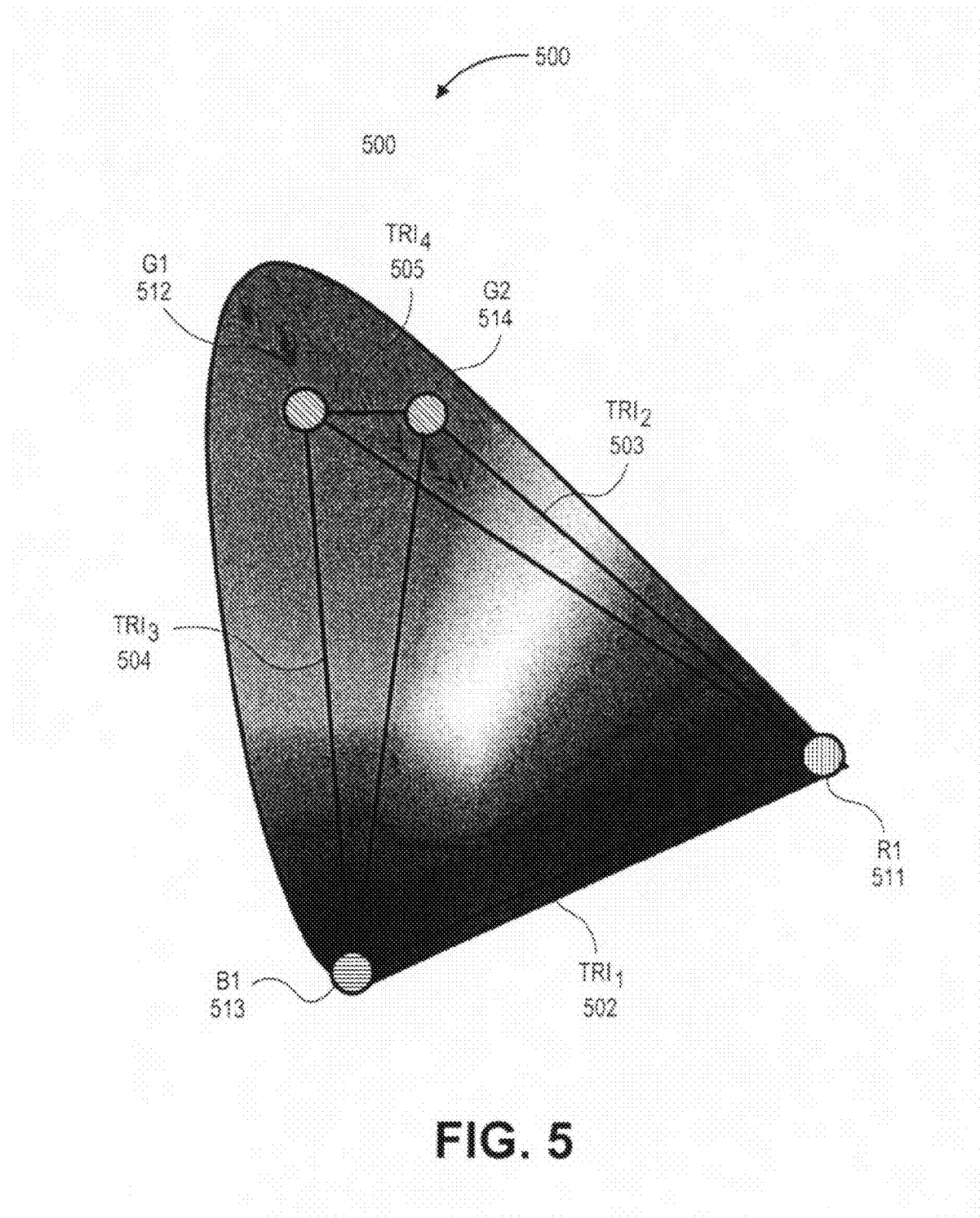
FIG. 5 illustrates one embodiment of a color space chart having four triplet color combinations of four light sources for deterministically calculating the dimming values for the four light sources.

FIG. 5 illustrates one embodiment of a color space chart 500 (rendered in gray-scale for convenience of illustration) having four triplet color combinations of four light sources 511-514 for deterministically calculating the dimming values for the four light sources 511-514. The four triplet color combinations of the four light sources 511-514 are represented as color gamut triangles 502-505 that are superimposed on the color chart 500. The area within the triangle 502 represents the color gamut of a first triplet color combination (R1, G1, B1), the area within the triangle 503 represents the color gamut of a second triplet color combination (R1, G2, B1), the area within the triangle 504 represents the color gamut of a third triplet color combination (G1, G2, B1), and the area within the triangle 505 represents the color gamut of a fourth triplet color combination (R1, G1, G2). Similarly, color points can be specified by an x-y coordinate pair and a luminous flux value, however, instead of corresponding to a specific R/G/B ratio, the color point corresponds to dimming values of four or more light sources, whose combined output generates the color point.

By mapping the color points of the four light sources 511-514 (e.g., LEDs) on the color space chart 500, there are four triangles formed by the lines drawn between the four color points of the four light sources 511-514. As described in more detail below, for each three-color combination triangle $TRI_1$-$TRI_4$ 502-505, the dimming values are determined, for example, using a three-color mixing equation. For each of the three-color combinations, if any of the three dimming values obtained for each triangle are negative, the solution is invalid. If the solution is valid, the three dimming values from that solution are saved. It should be noted that in this embodiment a solution is valid for at least two triangles, where the dimming values for some of the triangles may be negative because the color point is outside the corresponding color gamut. When two sets of three valid dimming values have been obtained, the six saved dimming values are added together so that there are four values, one for each of the four light sources 511-514. The six dimming values are added so that only dimming values generated for the same light source are added together. These four total dimming values may be scaled to the appropriate dimming resolution. The dimming values can then be converted to control signals to control the flux of the four light sources 511-514 so that the combined output of the four light sources 511-514 generate the requested color. It should be noted that it is not so important which of the four triangles 502-505 is matched up with a specific triplet of light sources 511-514, and the process can return the dimming values in whichever bit width as specified by the design of the device.

Figure 6:
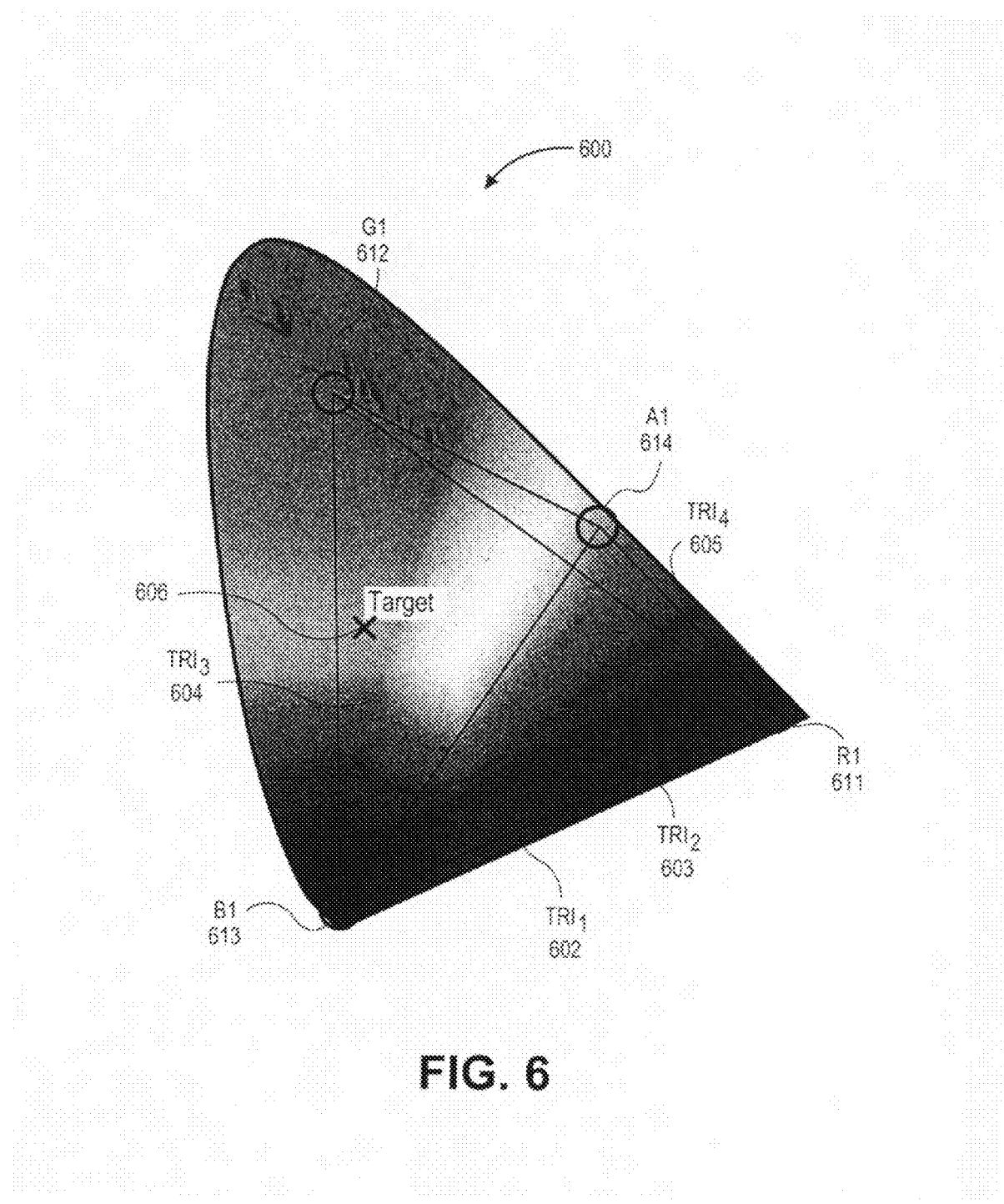
FIG. 6 illustrates another embodiment of a color space chart having four triplet color combinations of four light sources for deterministically calculating the dimming values for the four light sources.

FIG. 6 illustrates another embodiment of a color space chart 600 (rendered in gray-scale for convenience of illustration) having four triplet color combinations of four light sources 611-614 for deterministically calculating the dimming values for the four light sources 611-614. The four triplet color combinations of the four light sources 611-614 are represented as color gamut triangles 602-605 that are superimposed on the color chart 600. By mapping the color points of the four light sources 611-614 (e.g., LEDs) on the color space chart 600, there are four triangles formed by the lines drawn between the four color points of the four light sources 611-614. The area within the triangle 602 represents the color gamut of a first triplet color combination (R1, G1, B1), the area within the triangle 603 represents the color gamut of a second triplet color combination (R1, A1, B1), the area within the triangle 604 represents the color gamut of a third triplet color combination (G1, A1, B1), and the area within the triangle 605 represents the color gamut of a fourth triplet color combination (R1, G1, A1). Similarly, color points can be specified by an x-y coordinate pair and a luminous flux value, however, instead of corresponding to a specific R/G/B ratio, the color point corresponds to dimming values of four or more light sources, whose combined output generates the color point. The target 'X' 606 in FIG. 6 shows an arbitrary mixed color coordinate that could be requested. The color points at the edges of the triangles 602-605 represent the colors of the four lights sources 611-614. Although in this embodiment, there are four light sources for mixing colors, in other embodiments, more than four light sources may be used to mix colors.

As described herein, the four triangles 602-605 are treated as four separate three-color systems. For each three-color combination triangle $TRI_1$-$TRI_4$ 602-605, the dimming values are determined, for example, using a three-color mixing equation. For each of the three-color combinations, if any of the three dimming values obtained for each triangle are negative, the solution is invalid. If the solution is valid, the three dimming values are saved. Solutions are obtained for the two triangles in which the 'X' target 606 resides; in this case, triangles 602 and 604. The solutions from the other two triangles (e.g., triangles 603 and 605) in which 'X' target 606 does not reside will return invalid values (e.g., negative values) for the three-color mixing equations. The valid solutions from triangles 602 and 604 are then added together to obtain the dimming values for all four light sources 611-614 in the intelligent light source device. These four dimming values may be scaled to the appropriate dimming resolution. The dimming values can then be converted to control signals to control the flux of the four light sources 611-614 so that the combined output of the four light sources 611-614 generate the requested color (e.g., 'X' target 606). This method could be expanded to any number of colors to be mixed by the device.

Figure 7:
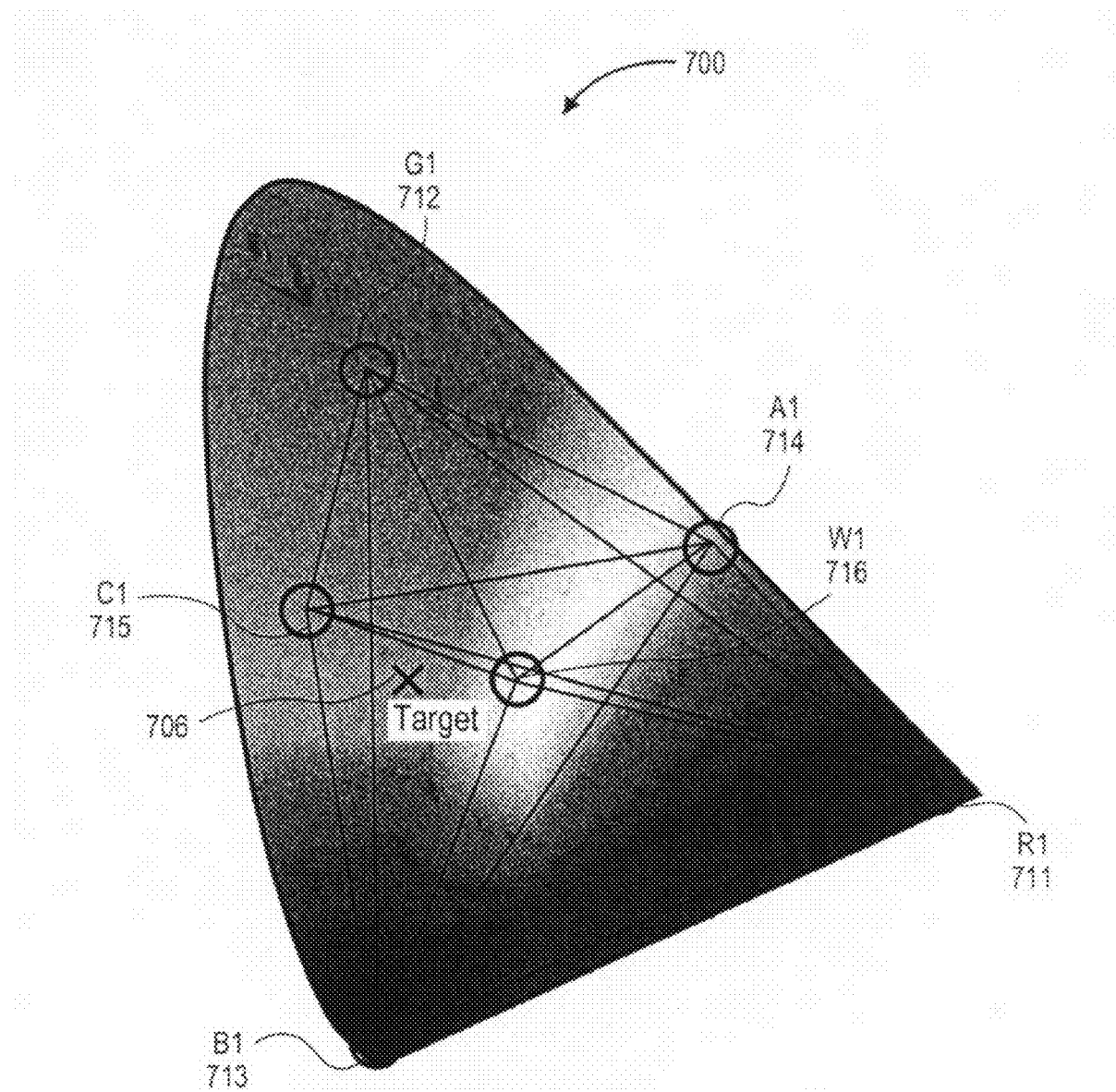
FIG. 7 illustrates another embodiment of a color space chart having twenty triplet color combinations of six light sources for deterministically calculating the dimming values for the six light sources.

FIG. 7 illustrates another embodiment of a color space chart 700 (rendered in gray-scale for convenience of illustration) having twenty triplet color combinations of six light sources 711-716 for deterministically calculating the dimming values for the six light sources 711-716. The lines between the six light sources 711-716 form multiple triplet color combinations of six light sources 711-716 for deterministically calculating the dimming values for the six light sources 711-716. By mapping the color points of the six light sources 711-716 (e.g., LEDs) on the color space chart 600, there are twenty triangles (not individually labeled) (e.g., twenty triplet combinations) formed by the lines drawn between the six color points of the six light sources 711-716. The area within each triangle represents the color gamut of the particular triplet color combination, for example, (R1, G1, B1), (R1, A1, B1), (G1, A1, B1), (R1, G1, A1), described with respect to the four light sources of FIG. 6, as well as triplet color combinations (C1, G1, W1), (C1, G1, A1), (C1, G1, R1), (C1, G1, B1), (C1, A1, W1), (C1, A1, R1), (C1, A1, B1), (C1, R1, W1), (C1, R1, B1), (W1, C1, B1), etc. Equation (12) represents the combination equation to determine the number of possible three-color combinations for a given number of light sources.

$$C(n, r) = \frac{n!}{r!(n-r)!} \tag{12}$$

This equation can be used to discover the number of combinations of a certain size (r) in a given set (n). For instance, if you want to solve for the number of triplet combination possible out of a set of six items, the equation would be:

$$C(6, 3) = \frac{6!}{3!(6-3)!} = \frac{6!}{3!(3!)} = 20 \tag{13}$$

Similarly, color points can be specified by an x-y coordinate pair and a luminous flux value, however, instead of corresponding to specific dimming values of three light source luminous intensities, the color point corresponds to dimming values of four or more light sources, whose combined output generates the color point. The target 'X' 706 in FIG. 7 shows an arbitrary mixed color coordinate that could be requested. Although in this embodiment, there are six light sources for mixing colors, in other embodiments, any number of light sources greater than three may be used to mix colors.

As described herein, the twenty triplet combination triangles are treated as separate three-color systems. For each triplet combination triangle, the dimming values are determined, for example, using a three-color mixing equation. For each of the three-color combinations, if any of the three dimming values obtained for each triangle are negative, the solution is invalid. If the solution is valid, the three dimming values are saved. Solutions are obtained for the four triangles in which the 'X' target 706 resides (e.g., triplet combinations (R1, G1, B1), (A1, G1, B1), (W1, G1, B1), and (C1, W1, B1). The solutions from the other triangles in which 'X' target 706 does not reside will return invalid values (e.g., negative values) for the three-color mixing equations. The valid solutions from the valid triplet combinations are then added together to obtain the dimming values for all six light sources 711-716 in the intelligent light source device. These total dimming values may be scaled to the appropriate dimming resolution. The dimming values can then be converted to control signals to control the flux of the six light sources 711-716 so that the combined output of the six light sources 711-716 generate the requested color (e.g., 'X' target 706). This method could be expanded to any number of colors greater than three to be mixed by the device.

Figure 8:
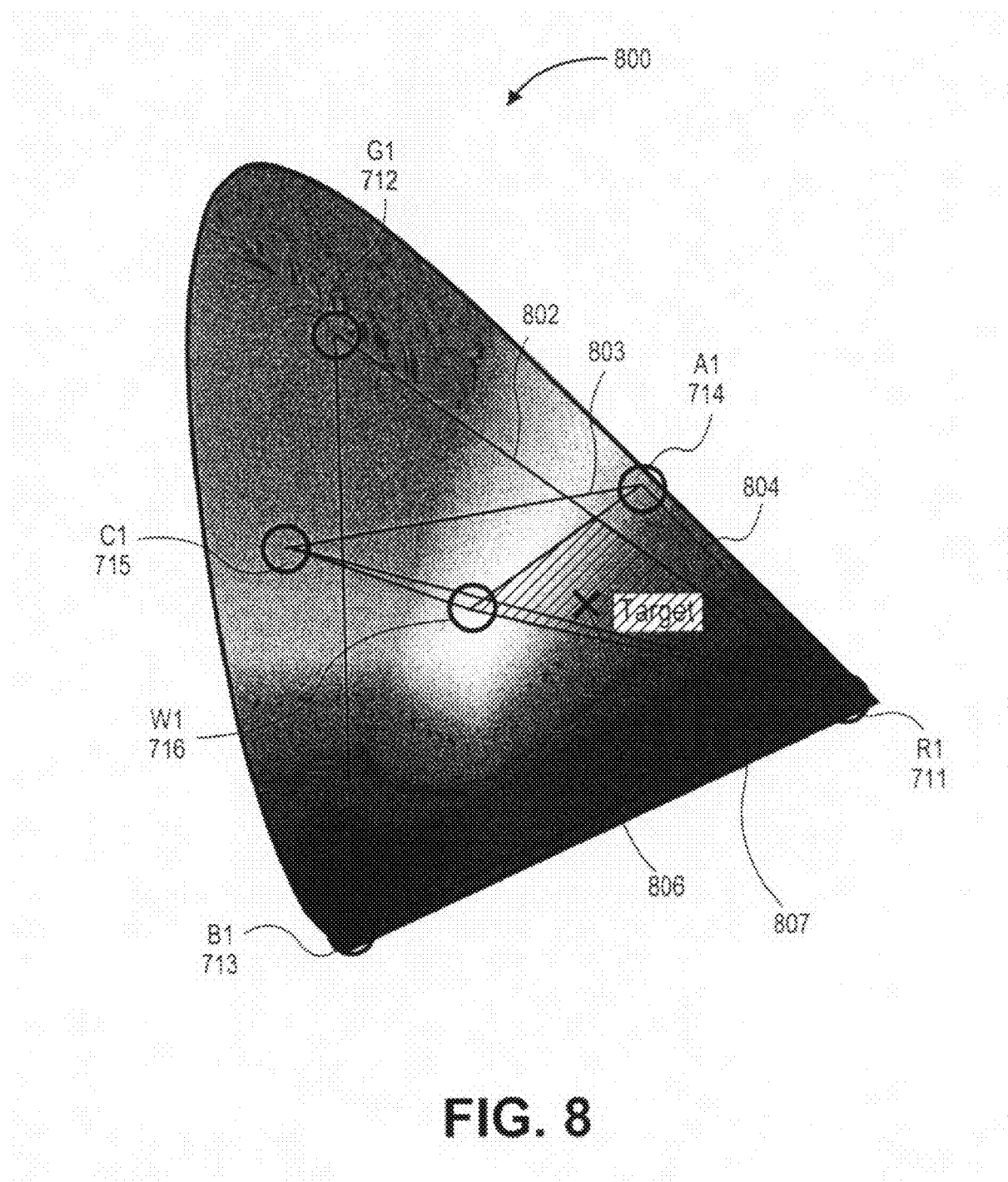
FIG. 8 illustrates one embodiment of a color space having a subset of triplet color combinations of six light sources for deterministically calculating the dimming values for the six light sources.

FIG. 8 illustrates one embodiment of a color space chart 800 (rendered in gray-scale for convenience of illustration) having a subset of triplet color combinations of six light sources 711-716 for deterministically calculating the dimming values for the six light sources 711-716. Instead of determining the dimming values for all triplet color combinations of the six light sources 711-716, dimming values of a subset of less than all triplet combinations of the six light sources 711-716 can be determined. In this embodiment, the dimming values of a maximum of three triangles 802, 803, and 804 need to be solved to determine the dimming values of the six light source 711-716 for the 'X' target 806. Hatched area 807 represents an area of the color chart that has a very good color resolution and a very good CRI for the 'X' target 806. In particular, the area has as good of color resolution and CRI as it would if all twenty color combinations were used to generate the mixed color. So, if the hatched area 807 in which the 'X' target 806 is located, is the area of interest, the other triangles outside of the hashed area 807 can be ignored, and the three triangles 802, 803, and 804 can be used to generate the mixed color at the 'X' target 806. It should be noted that all other areas outside the hatched area 807 does not have as good of resolution or CRI as it would if using all of the triangles. So essentially, color quality can be sacrificed to reduce the amount of CPU usage. Two possible drawbacks of this embodiment, is that some of the color gamut is sacrificed, and some CRI is sacrificed over much of the color gamut that is realizable. Regarding the color gamut, the total area covered by all triangles is smaller than in FIG. 7, which illustrates the result in sacrifice in the color gamut. Regarding the CRI, other than in the hatched area 807, the CRI is reduced everywhere else, since fewer light sources are used to generate mixed colors that are still valid, resulting in a sacrifice in color resolution and CRI. However, the color gamut, color resolution, and CRI within the hatched area 807 are not reduced. It should be noted that the quality of the color gamut and CRI increases by determining the dimming values for more triplet combinations. However, the additional triplet combinations may result in invalid dimming values. In order to reduce the computations and the computation time for determining the dimming values, a subset of all of the triplet combinations may be used in determining the dimming values. The subset of the triplet combinations may be determined by a designer for a particular implementation.

In another embodiment, any subset of all possible triangles could be used to determine the dimming values of the six light sources 711-716. For example, in one embodiment, the subset of four triplet color combinations may be used, such as triangles 802, 803, and 804, as well as the triplet color combination (B1, A1, R1). Alternatively, other combinations of triplet combinations may be used in the subset of four triplet color combinations of the six light sources 711-716. Similarly, a subset of four or more light sources may be used to determine the dimming values for the four or more light sources.

Figure 9:
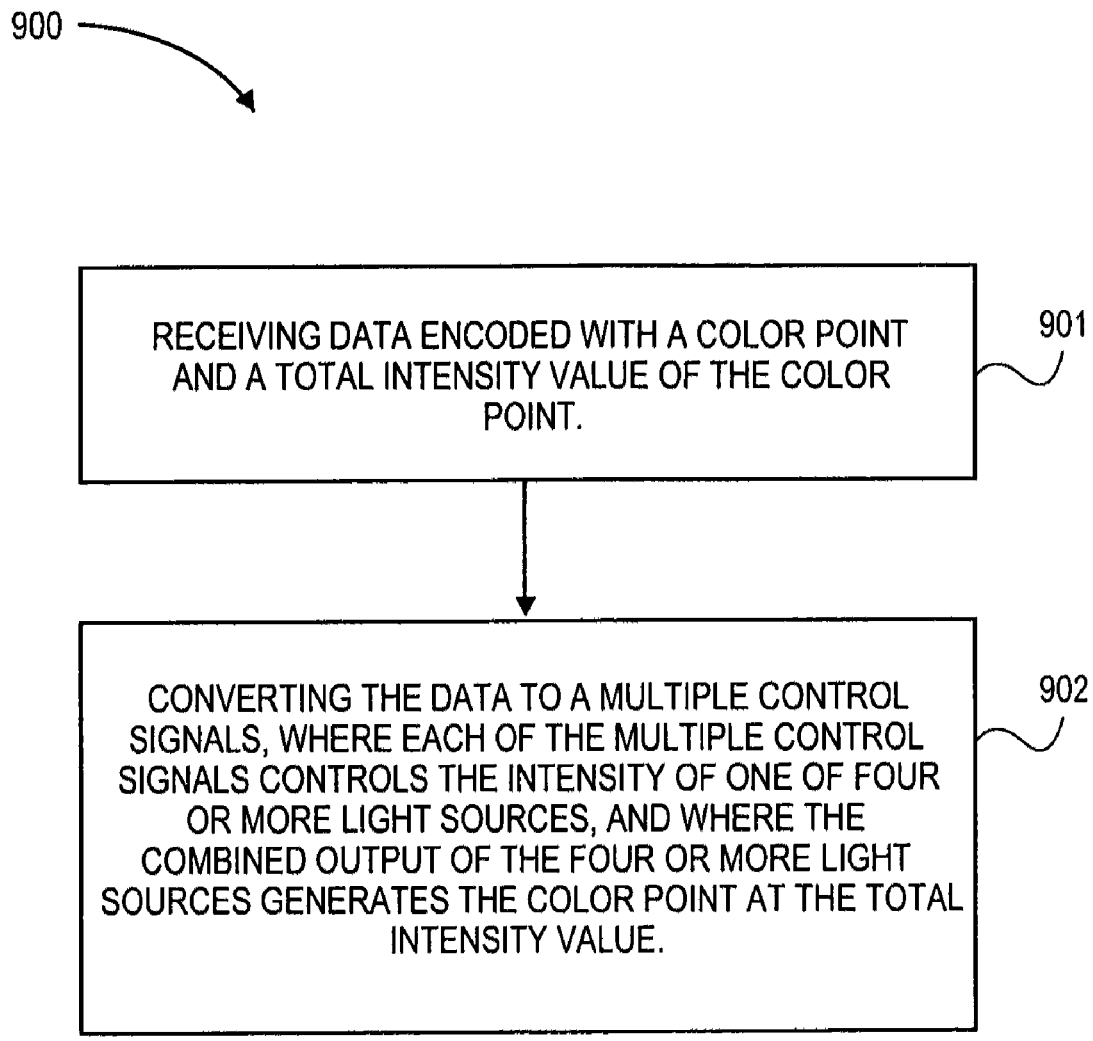
FIG. 9 is a flowchart illustrating a method for controlling a networked illumination device in one embodiment.

FIG. 9 is a flowchart illustrating a method 900 for controlling a networked illumination device in one embodiment. The method begins by receiving data (e.g., from a network controller) encoded with a color point and a total luminous flux value of the color point (operation 901). Next, the data is converted to multiple control signals by deterministically calculating the dimming values for the light source having four or more color channels, where each of the control signals controls the luminous flux of one of the four or more color channels, and where the combined output of the four or more color channels generates the color point at the total luminous flux value (operation 902).

Figure 10:
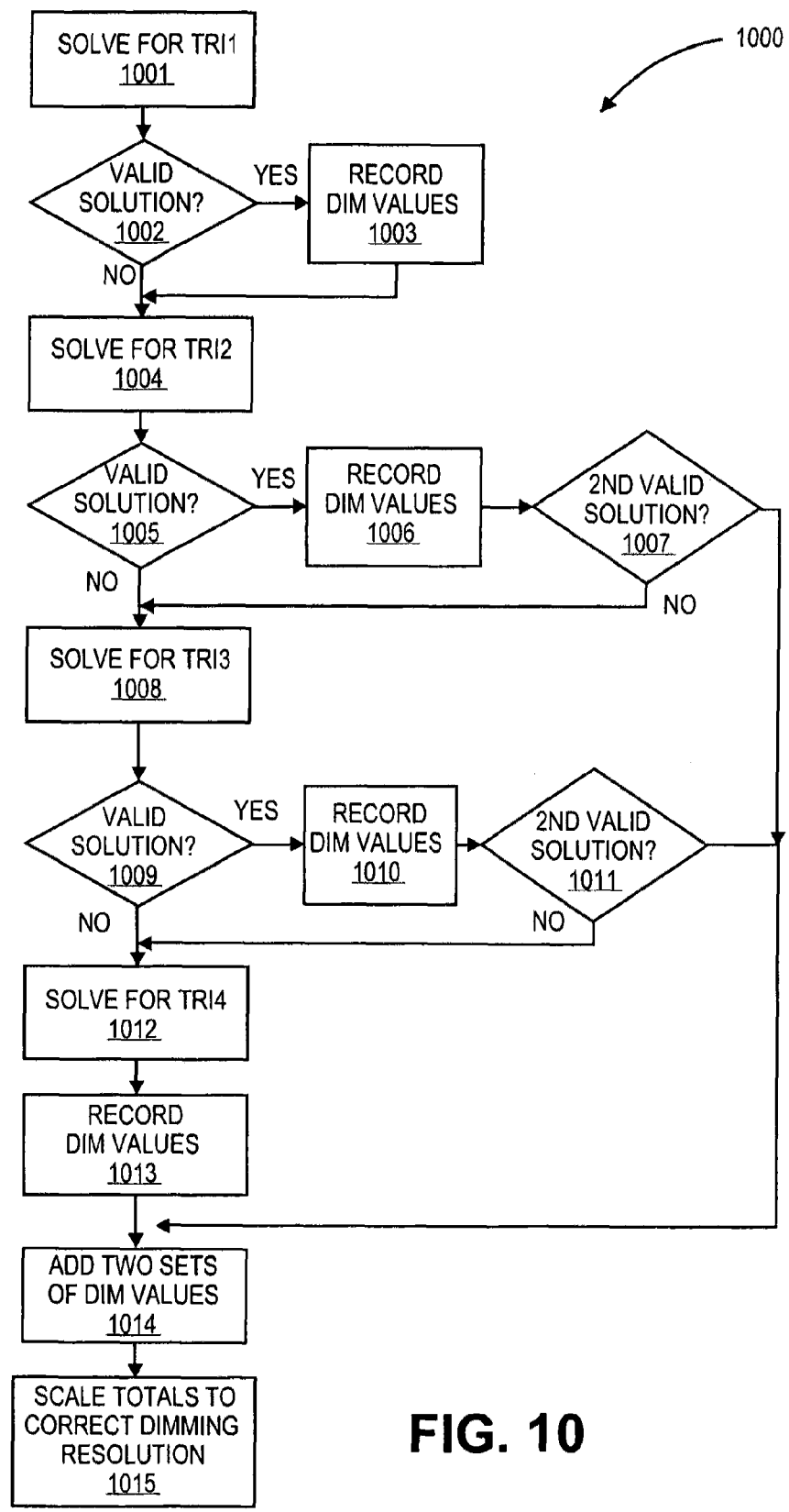
FIG. 10 is a flowchart illustrating a method for deterministically calculating dimming values for four light sources of a networked illumination device in one embodiment.

FIG. 10 is a flowchart illustrating a method 1000 for deterministically calculating dimming values for four light sources of a networked illumination device in one embodiment. First, the first triangle $TRI_1$ (e.g., 602) is solved to determine the dimming values for the first triplet color combination (e.g., (R1, G1, B1)), operation 1001. The process returns the dimming values in whichever bit width as specified by the design of the intelligent light source device. The method 1000 then determines if the returned dimming values are a valid solution, operation 1002. In one embodiment, if any of the three dimming values obtained from this process are negative, then the solution is invalid and the method does not save the dimming values. If the solution is a valid solution, the three dimming values are saved (e.g., recorded in memory), operation 1003. The method then solves for the dimming values of the second triangle $TRI_2$ (e.g., 603) for the second triplet color combination (e.g., (R1, A1, B1)), operation 1004. The method 1000 then determines if the returned dimming values are a valid solution, operation 1005. If the returned dimming values are valid, the dimming values are saved (e.g., recorded in memory), operation 1006, and the method determines if the returned dimming values are the second valid solution, operation 1007. If the returned dimming values are the second valid solution in operation 1007, the method skips to the "Add Two sets of Dimming Values" operation 1014, discussed below. However, if the returned dimming values are not the second valid solution in operation 1007, the method returns to operation 1008 to solve for the dimming values of the third triangle $TRI_3$ (e.g., 604) for the third triplet color combination (e.g., (G1, A1, B1)). The method 1000 then determines if the returned dimming values are a valid solution, operation 1009. If the returned dimming values are valid, the dimming values are saved (e.g., recorded in memory), operation 1010, and the method determines if the returned dimming values are the second valid solution, operation 1011. If the returned dimming values are the second valid solution in operation 1011, the method skips to the "Add Two sets of Dimming Values"

operation 1014, discussed below. However, if the returned dimming values are not the second valid solution in operation 1011, the method returns to operation 1012 to solve for the dimming values of the fourth triangle TRI$_4$ (e.g., 605) for the fourth triplet color combination (e.g., (G1, A1, B1)) and the dimming values are saved (e.g., recorded in memory), operation 1013. At this point in the flow, two sets of three valid dimming values have been obtained, the method 1000 performs the "Add Two sets of Dimming Values" operation 1014, in which the six saved dimming values are added together, resulting in four dimming values, one for each of the four light sources (e.g., 611-614). These four values may be scaled to the appropriate dimming resolution, operation 1015, and the dimming value solution is complete.

Although the embodiment of FIG. 10 illustrates and describes a method for deterministically calculating the dimming values for four light sources and four triplet color combinations to generate a requested color, in other embodiments, the method can deterministically calculate the dimming values for more than four light sources to generate a requested color.

Figure 11:
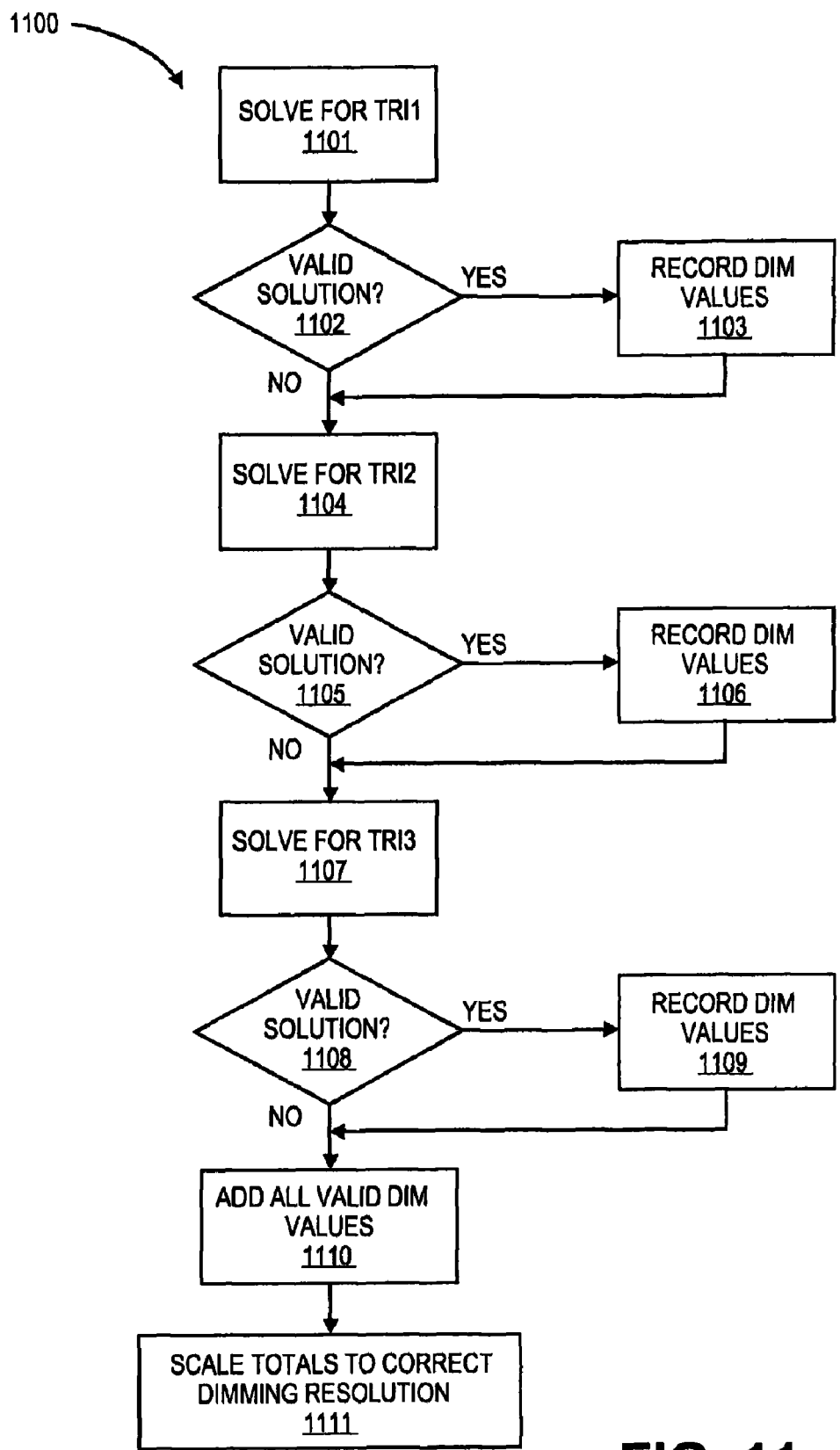
FIG. 11 is a flowchart illustrating a method for deterministically calculating dimming values for six light sources using a subset of triplet color combinations in one embodiment.

FIG. 11 is a flowchart illustrating a method 1100 for deterministically calculating dimming values for six light sources using a subset of triplet color combinations in one embodiment. As described with respect to FIG. 8, instead of determining the dimming values for all triplet color combinations of the six light sources, dimming values of a subset of less than all triplet combinations of the six light sources can be determined. First, the first triangle TRI$_1$ (e.g., 802) is solved to determine the dimming values for the first triplet color combination (e.g., (R1, G1, B1)), operation 1101. The process returns the dimming values in whichever bit width as specified by the design of the intelligent light source device. The method 1100 then determines if the returned dimming values are a valid solution, operation 1102. In one embodiment, if any of the three dimming values obtained from this process are negative, then the solution is invalid and the method does not save the dimming values. If the solution is a valid solution, the three dimming values are saved (e.g., recorded in memory), operation 1103. The method then solves for the dimming values of the second triangle TRI$_2$ (e.g., 803) for the second triplet color combination (e.g., (R1, C1, A1)), operation 1104. The method 1100 then determines if the returned dimming values are a valid solution, operation 1105. If the returned dimming values are valid, the dimming values are saved (e.g., recorded in memory), operation 1106. The method then solves for the dimming values of the third triangle TRI$_3$ (e.g., 804) for the third triplet color combination (e.g., (R1, W1, A1)), operation 1107. The method 1100 then determines if the returned dimming values are a valid solution, operation 1108. If the returned dimming values are valid, the dimming values are saved (e.g., recorded in memory), operation 1109. At this point in the flow, three possible sets of three valid dimming values have been obtained, and the method 1100 performs the "Add All Valid Dimming Values" operation 1110, in which the three saved dimming values are added together, resulting in six dimming values, one for each of the six light sources (e.g., 711-716). These six values may be scaled to the appropriate dimming resolution, operation 1111, and the dimming value solution is complete.

Although the embodiment of FIG. 11 illustrates and describes a method for deterministically calculating the dimming values for six light sources using three color combinations to generate a requested color, in other embodiments, the method can deterministically calculate the dimming values for other numbers of light sources and other numbers of combinations and subsets of combinations to generate a requested color.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; electrical, optical, acoustical, or other form of propagated signal (e.g., carrier waves, infrared signals, digital signals, or the like); or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method, comprising:
receiving data encoded with a color point;
deterministically calculating dimming values for each of four or more light sources without using a look-up table of the dimming values to generate a color point, wherein the combined output of the four or more light sources generates the color point;
solving for a plurality of dimming values for each of a plurality of three-color combinations of the four or more light sources using the received data; and summing the plurality of dimming values for each of the plurality of three-color combinations using superposition, wherein the combined output of the four or more light sources generates the color point.

2. The method of claim 1, further comprising converting the data to a plurality of control signals that correspond to the plurality of dimming values for each of the four or more light sources, wherein each of the plurality of controls signals controls a luminous flux of one of four or more light sources, and wherein said converting comprises:
determining a dimming value for each light source of a first three-color combination of the four or more light sources;
determining a dimming value for each light source of a second three-color combination of the four or more light sources, wherein the first and second three-color combinations do not include the same three light sources; and
summing the dimming values determined for each light source of the first and second three-color combinations, wherein the plurality of control signals correspond to the summed dimming values.

3. The method of claim 1, wherein said determining the dimming value for each light source of the first and second three-color combination comprises:
solving for three dimming values for the first three-color combination using linear algebra; and
solving for three dimming values for the second three-color combination using linear algebra, and wherein said summing comprises adding the three dimming values for the first three-color combination to the three dimming values for the second three-color combination using superposition to determine the dimming value for each of the four or more light sources.

4. The method of claim 1, wherein said determining the dimming value for each light source of the first and second three-color combination comprises:
solving for three dimming values for the first three-color combination using a three-color mixing equation; and
solving for three dimming values for the second three-color combination using the three-color mixing equation, and wherein said summing comprises adding the three dimming values for the first three-color combination to the three dimming values for the second three-color combination using superposition to determine the dimming value for each of the four or more light sources.

5. The method of claim 1, further comprising scaling the dimming values determined for each light source of the first and second three-color combinations.

6. The method of claim 1, wherein the plurality of control signals are stochastic signal density modulation (SSDM) dimming signals.

7. The method of claim 2, further comprising:
sensing an operating condition in each of the four or more light sources; and
modifying the plurality of control signals to compensate for changes in the operating condition, wherein the color point generated by the four or more light sources is maintained.

8. The method of claim 7, wherein the operating condition comprises one or more of a junction temperature, a dominant wavelength, and a luminous flux of one or more of the four or more light sources.

9. The method of claim 2, wherein said converting the data to the plurality of control signals comprises:
decoding the data into data representative of the color point and data representative of a total luminous flux value; and
separating the data representative of the color point into a first coordinate and a second coordinate, wherein the first coordinate and the second coordinate correspond to the color point on a standard color chart.

10. A method, comprising:
receiving data encoded with a color point;
deterministically calculating dimming values for each of four or more light sources without using a look-up table of the dimming values to generate a color point, wherein the combined output of the four or more light sources generates the color point;
solving for a plurality of dimming values for a subset of the total number of three-color combinations of the four or more light sources using the received data; and
summing the plurality of solved dimming values using superposition, wherein the combined output of the four or more light sources generates the color point.

11. An apparatus, comprising:
a processing device configured to receive data encoded with a color point and to deterministically calculate dimming values from the received data for four or more light sources associated with four or more colors by using superposition of a plurality of dimming values of a plurality of different three-color combinations of the four or more light sources determined using a three-color mixing equation, wherein the received data includes a total luminous flux value of the color point in addition to the color point, and wherein the processing device is configured to convert the data to a plurality of control signals to control intensities of the four or more light sources to generate the color point at the total luminous flux value, wherein each of the plurality of control signals corresponds to the dimming value for each of the four or more light sources.

12. The apparatus of claim 11, further comprising the four or more light sources coupled to the processing device, and wherein the processing device comprises four or more control modules, corresponding to the four or more light sources, to each receive a dimming signal to control the luminous flux of a corresponding light source.

13. The apparatus of claim 12, further comprising a sensor for each of the four or more light sources to sense a parameter indicative of a change in an operating condition in the respective light source, wherein the sensor generates a feedback signal indicative of the operating condition, and wherein each of the control modules is configured to adjust the corresponding control signal to compensate for the change in operating condition.

14. The apparatus of claim 11, wherein the plurality of control signals are stochastic signal density modulation (SSDM) dimming signals.

15. The apparatus of claim 11, wherein the plurality of control signals are pulse width modulation (PWM) dimming signals.

16. An apparatus, comprising:

means for receiving data encoded with a color point;

means for deterministically calculating dimming values for each of four or more light sources associated with four or more colors without using a look-up table of the dimming values, wherein a combined output of the four or more light sources generate the color point according to the dimming values;

means for solving for a plurality of dimming values for each of a plurality of three-color combinations of the four or more light sources using the received data; and means for summing the plurality of dimming values for each of the plurality of three-color combinations using superposition, wherein the combined output of the four or more light sources generates the color point.

17. The apparatus of claim 16, wherein the means for deterministically calculating increases the color rendering index (CRI) of the color point.

18. The apparatus of claim 16, wherein the means for deterministically calculating increases a color gamut of the apparatus.

* * * * *